United States Patent [19]
Seymour

[11] Patent Number: 5,805,444
[45] Date of Patent: Sep. 8, 1998

[54] METHOD AND SYSTEM FOR PROVIDING A TEMPORAL INTERFACE FOR USE IN IMPLEMENTING A PROCESS

[75] Inventor: James M. Seymour, Alpharetta, Ga.

[73] Assignee: BellSouth Corporation, Atlanta, Ga.

[21] Appl. No.: 652,732

[22] Filed: May 22, 1996

[51] Int. Cl.$^6$ .................................................. G05B 11/01
[52] U.S. Cl. ................... 364/145; 364/188; 364/705.08; 345/963
[58] Field of Search ..................................... 395/963, 340, 395/348, 326, 906, 914, 912, 349, 208, 209; 345/146, 115, 156, 963, 340, 326, 348, 349; 364/143–146, 705.07, 705.08, 188; 368/28, 41; 379/201, 210–217, 207; 455/4.2, 6.3; 705/8, 9

[56] References Cited

U.S. PATENT DOCUMENTS

| | | | |
|---|---|---|---|
| 5,023,851 | 6/1991 | Murray et al. | 368/41 |
| 5,058,113 | 10/1991 | Burnham et al. | 371/15.1 |
| 5,461,558 | 10/1995 | Patsiokas et al. | 364/145 |
| 5,500,938 | 3/1996 | Cahill et al. | 395/326 |
| 5,530,684 | 6/1996 | Kataoka | 368/41 |
| 5,570,109 | 10/1996 | Jenson | 345/146 |
| 5,634,100 | 5/1997 | Capps | 395/209 |

Primary Examiner—Thomas C. Lee
Assistant Examiner—Steven R. Garland
Attorney, Agent, or Firm—Jones & Askew

[57] ABSTRACT

A system and method for defining and depicting the operational mode of a process based on temporal factors in a system including a computer that provides for user input through a graphical user interface. A day class template including a time and mode category is displayed on the graphical user interface. The time category depicts a plurality of indicators that are chronologically arranged to represent selected times within a twenty-four hour period. Upon receipt of a definition of an interval of time from a user, the interval of time is displayed on the day class template. Upon receipt of a specification of a mode of operation of the process during the interval of time, a representation of the mode of operation is displayed on the day class template. The process then is operated pursuant to the specified mode of operation during the interval of time. A calendar including day blocks also is displayed on the graphical user interface. The calendar is used to facilitate the scheduling and display of modes of operation of the relevant process over a period of time longer than a day. The calendar is displayed so that calendar days that run a particular schedule of the process as defined by a day class template are distinguished from other days on the calendar. A user can select a day from the calendar and view the day class template including the schedule of mode operation for that day.

40 Claims, 14 Drawing Sheets

FIG.4A

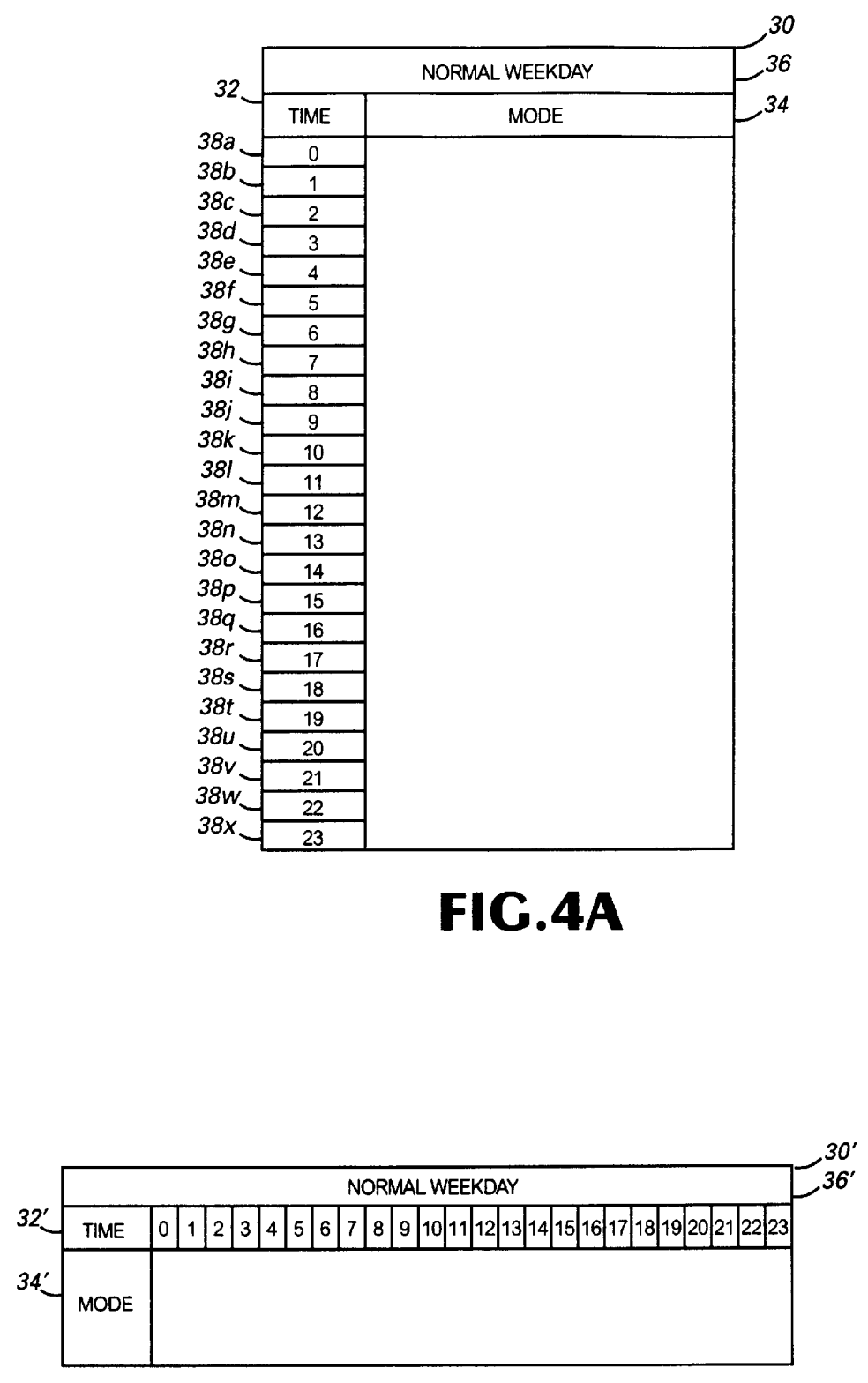

| TIME | MODE |
|---|---|
| 0 | |
| 1 | |
| 2 | |
| 3 | |
| 4 | |
| 5 | |
| 6 | |
| 7 | |
| 8 | |
| 9 | |
| 10 | |
| 11 | |
| 12 | |
| 13 | |
| 14 | |
| 15 | |
| 16 | |
| 17 | |
| 18 | |
| 19 | |
| 20 | |
| 21 | |
| 22 | |
| 23 | |

NORMAL WEEKDAY

FIG.4B

NORMAL WEEKDAY

| TIME | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| MODE | | | | | | | | | | | | | | | | | | | | | | | | |

|  | S | M | T | W | T | F | S |
|---|---|---|---|---|---|---|---|
| 64a | 61a | 61b | 61c | 61d | 61e | 61f | 61g |
| 64b | 61h | 61i | 61j | 61k | ■ | 61m | 61n |
| 64c | 61o | 61p | 61q | 61r | 61s | 61t | 61u |
| 64d | 61v | 61w | 61x | 61y | 61z | 61aa | 61bb |
| 64e | 61cc | 61dd | 61ee | 61ff | 61gg | 61hh | 61ii |

FIG. 5A

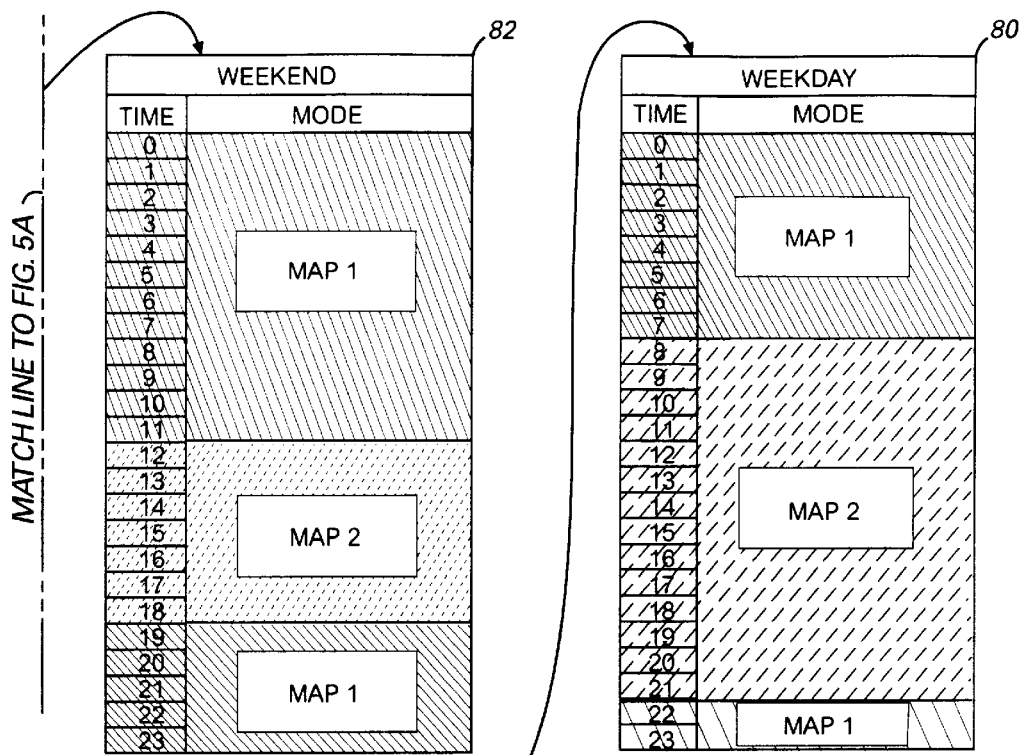
FIG. 5D FIG. 5C
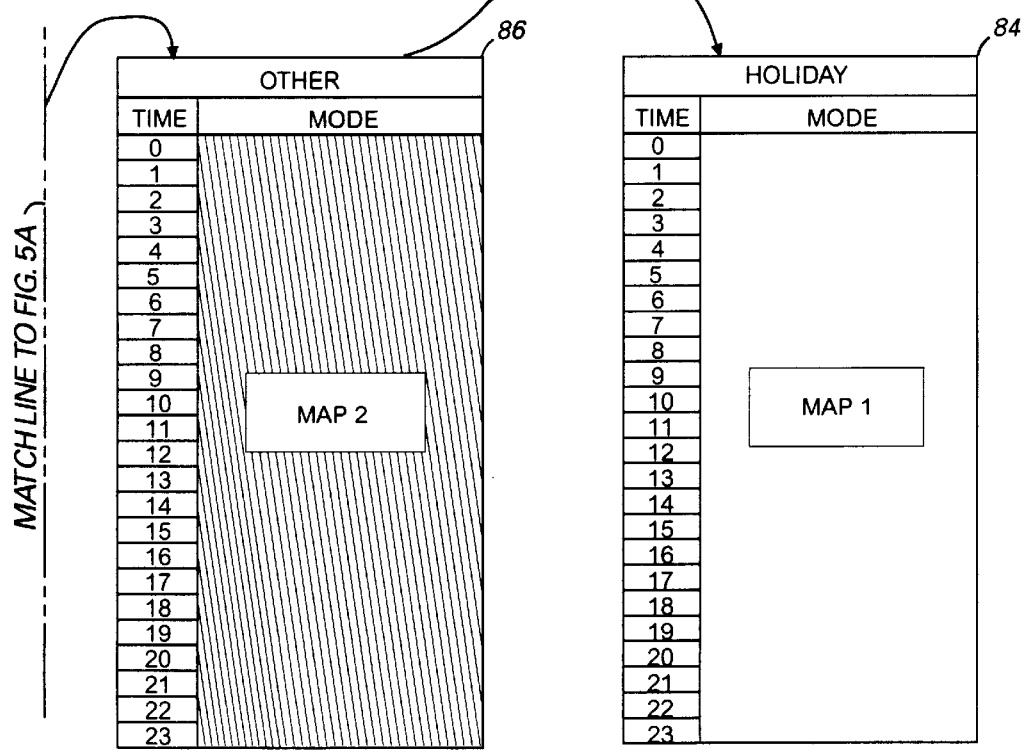
FIG. 5F FIG. 5E

METHOD AND SYSTEM FOR PROVIDING A TEMPORAL INTERFACE FOR USE IN IMPLEMENTING A PROCESS

TECHNICAL FIELD

The present invention relates to the field of automatic implementation techniques for a process based on temporal factors, and in particular, relates to the field of computer systems employing graphical user interfaces as part of such automatic implementation techniques.

BACKGROUND OF THE INVENTION

Myriad processes are operated or controlled through the use of computers. Yet, these computers require instructions so as to properly execute the operation or control of the desired processes. We have not as yet developed computers as advanced as the fictitious H.A.L. in the novel 2001 by Arthur C. Clarke (and the movie, 2001: A Space Odyssey) that operate or control many processes with minimal instructions. In the world of today's science fact as opposed to science fiction, a computer requires detailed instructions for the operation or control of a desired process. Ideally, the person who provides the computer instructions should be an expert with respect to the operation of the relevant computer. The person's expertise provides at least some assurance that the computer instructions will properly instruct the computer to carry out the desired operations or control processes. Nonetheless, it is inefficient and inconvenient to limit the input of computer instructions only to persons who are experts with respect to the operation of the relevant computer.

In certain areas relating to the operation of computer controlled processes, it is more efficient and otherwise advantageous to have someone other than the computer expert provide instructions to the computer. One such area is the scheduling of processes based on temporal factors such as month, week, day of the week, and time of day. For example, a particular process may have several different modes of operation that operate respectively on different days or at different times. Many processes with time dependent modes of operation come to mind such as heating and air conditioning systems, security systems, and lighting systems. For purposes of the present application, we refer in general to processes that include telecommunication services and in particular to the process that is a telecommunication service known as "Area Number Calling". The Area Number Calling service is described in the pending patent application entitled "Area Number Calling", Ser. No. 08/204,677, filed on Mar. 1, 1994, now U.S. Pat. No. 5,533,107, and assigned to the assignee of the present application. This Area Number Calling patent application is incorporated herein by reference.

Although the Area Number Calling service is used to illustrate the problems with the prior art and to provide a context for the present invention, it should be appreciated that the present invention is applicable to other processes as well and is not to be limited to telecommunication services.

The Area Number Calling service allows a subscriber with multiple locations within an area of service contained in a single local access transport area (LATA) to utilize a single telephone directory number for all of its services. All callers dial the same number to reach the subscriber's business. The telephone network routes each call to the most appropriate subscriber location generally based on the geographic location of the caller, time of day, day of week, and/or percent distribution of calls among the subscriber locations. For example, a pizza business with multiple pizza parlors advertises a single telephone number. A caller desperate for a pizza, calls the advertised telephone number, and the call is routed to the pizza parlor that can get the pizza the fastest to the desperate caller based on the caller's location, the day of the week and the time of the day. The result is a satisfied pizza customer, and a happy pizza business owner, who is pleased with the Area Number Calling service.

The Area Number Calling service, like other services and processes, allows a subscriber or user to define one or more modes of operation of the service or process. A mode of operation as used herein is defined as the methodology or steps followed in the execution of the process. For example, in one mode of operation, a subscriber to the Area Number Calling service may specify that all calls received from a certain geographic area be directed to a selected pizza parlor. In another mode of operation, the subscriber may specify that all calls received from that certain geographic area be directed to a different selected pizza parlor. Similarly, with respect to a security system, one mode of the security system's process may allow entry to a facility to all persons with a particular personal identification number, and another mode of the security system's process may deny entry to the facility to all persons with that particular personal identification number. With respect to HVAC processes, one mode of the HVAC process may run the heating system and another mode of the HVAC process may run the air conditioning system.

The Area Number Calling service, like other services and processes, allows a subscriber or user to define the operational mode of the service or process based on temporal factors such as month, week, day of the week, and time of day. For example, a subscriber to the Area Number Calling service may specify that a first mode of operation of the service be implemented during a certain interval of time during a twenty-four hour day. The subscriber may specify that all calls received from a certain geographic area be directed to a selected pizza parlor between the hours of 11:00 A.M. through 2:00 P.M., i.e., the lunch hour. The subscriber may further specify that a second mode of operation of the service be implemented during a different interval of time during the same twenty-hour day. The subscriber may specify that all calls received from the certain geographic area be directed to a different pizza parlor between the hours of 4:00 P.M. through 7:00 P.M., i.e., supper time. In addition, the subscriber may specify that this schedule of the modes of operation of the process be repeated every week day, and that a different schedule of the modes of operation of the process be implemented on weekends. Thus, the Area Number Calling service provides a subscriber with many scheduling options for the modes of operation of the service. Similarly, other services and processes include scheduling options for the modes of operation of the respective services and processes.

To implement the schedule for the modes of operation of the Area Number Calling service, a representative of the service provider generally first collects the information for such a schedule from a subscriber. To accomplish the implementation of the service according to the schedule specified by the subscriber, the computer system controlling the Area Number Calling service must be provided with instructions corresponding to the schedule. In the Area Number Calling service, these instructions are provided by a person or user who inputs the instructions through the use of a decision graph editor (also known as a decision graph tool, decision graph file, or simply as a decision graph, and also known as a decision table). A decision graph editor maps out the decisions that have to be made with respect to a process, and hence determines the operational mode of a process. A decision graph editor is usually a row-and-column layout that outlines specific conditions and the possible actions or outcomes related to each. A decision graph editor also may have the appearance of a decision tree in which nodes representing decision points branch into more and more specific alternative outcomes until an end point (a leaf) is reached that is the result of all the prior decisions made. An example of a decision graph is illustrated in FIG. 1.

As is evident from a quick perusal of the decision graph shown in FIG. 1, a decision graph is difficult to create and to read. The creation of a decision graph to implement the service schedule selected by a subscriber requires familiarity with computer programming and with programming languages and techniques. The creation of the decision graph is time consuming even for a person having familiarity with such programming tools. Further, the creation of the decision graph based on the service schedule selected by the subscriber is anti-intuitive. A schedule of the modes of operation of a selected process must be broken down into a hierarchy of decisions that leads to the ultimate desired result in each case. In breaking the schedule into a series of decisions and decision paths, the programmer may lose the "schedule" in the branches of the decision tree, and the "leaves" may not yield the correct result without a lot of time and effort.

As also can be seen from the decision graph shown in FIG. 1, a reader of the decision graph does not readily grasp the information provided by the decision graph. Rather, the reader must follow each decision path to its conclusion, and then compile the information to achieve an overall picture of the schedule of modes of operation for the particular process. Furthermore, a decision graph becomes increasingly more difficult to understand and maintain as its size increases.

To overcome the necessity of a computer expert for imparting instructions to a computer, computer operating systems frequently employ a graphical user interface ("GUI") as a convenient means of exchanging information between the user and the computer system. Generally, a graphical user interface is a type of display format that enables the user to choose commands, start programs, and see lists of files and other options by pointing to graphical representations (icons) and lists of menu items on the screen. A graphical user interface operates as part of the operating system and provides an interface to the operating system, and to application programs running in conjunction with the same. The graphical user interface readily provides a user with access to files and to functions of the files. Graphical user interfaces are used on the Apple Macintosh® computer and by such computer programs as Microsoft Windows® and the OS/2 Presentation Manager.

A user typically interacts with a graphical user interface through an input device such as the keyboard or a mouse or a combination of both. On the graphical user interface, icons typically represent computer objects such as files and folders that can be manipulated by the user. A user initiates manipulation of an object by selecting the icon representing the object. This selection is accomplished by positioning the cursor over the icon associated with the object and clicking a button on the mouse. The file or folder represented by the icon is launched for manipulation by the user by selecting the icon and repeating the clicking of the button on the mouse (i.e., double-clicking). In addition, the object represented by the icon may be manipulated through movements of the corresponding icon on the graphical user interface. An icon may be moved on the graphical user interface in a series of steps. First, the icon is selected. Then, while holding the button on the mouse in a down position, the mouse is moved by the user. The movement of the mouse is translated through the use of a roller ball on the underside of the mouse into directional commands. The directional commands are further translated by the operating system into movement of the cursor and the icon on the screen. Once the icon has been moved to the desired location, the mouse button is released, and the icon is left at the new location. This is known as "dragging and dropping".

One known system has made use of a graphical user interface as a temporal interface for use in implementing a process, and in particular, for use in implementing telecommunications services. This system provides a graphic image depicting a clock face including the numerals "1" through "12" representing the twelve hours of a typical clock face. A representation of this clock interface is illustrated in FIG. 2. To use this clock interface, a user specifies the implementation schedule for the modes of operation of the process by selecting a wedge of time on the clock face for each mode of operation. For example, as illustrated in FIG. 2, a wedge of time between 1:00 and 2:00 has been selected for specification of a mode of operation of the process to be implemented.

This clock interface is only of limited usefulness. The clock interface provides only minimal information and presents such minimal information in a non-intuitive form. The clock interface provides schedule information only for a twelve hour period. Further, it is unclear from the clock interface which twelve hour period, noon to midnight or midnight to noon, is specified. The clock interface does not provide any information about a schedule of mode operation of the process over a longer period than twelve hours. In particular, the clock interface does not provide any such schedule information on a weekly, monthly or yearly basis.

As noted, the clock interface provides a non-intuitive graphic representation of a clock face. One of the non-intuitive aspects to the use of the clock face is that such use is based on module twelve, rather than the common decimal system. Another non-intuitive aspect to the use of the clock face is that the schedule of mode operation is difficult to deduce from the information provided on the clock face. It takes some thought to establish a connection between the clock face and the schedule for mode operation of the relevant process. In fact, a multistage reasoning process is necessary in order to relate the information provided on the clock face to the schedule for mode operation of the relevant process.

Thus, there is a need in the art for an improved method and an improved system for providing a temporal interface for use in the implementation of a process.

There is also a need in the art for a method and system for providing a temporal interface for use in the implementation of a process that does not require a familiarity with computer programming and with programming languages and techniques.

There is a further need in the art for a method and system for providing a temporal interface for use in the implementation of a process that is efficient, easy and quick to create, to read and to use.

There is an additional need in the art for a method and system for providing a temporal interface for use in the implementation of a process that is intuitive to create, to read and to use.

There is also a need in the art for a method and system for providing a temporal interface for use in the implementation of a process that readily provides significant information to the user.

Further, there is a need in the art for a method and system for providing a temporal interface for use in the implementation of a process that readily provides scheduling information about mode operation over a period of time such as a week, month or year.

SUMMARY OF THE INVENTION

Stated generally, the present invention provides a system and method for defining and depicting the operational mode of a process based on temporal factors in a system including a computer that provides for user input through a graphical user interface. A day class template is used to define and display the operational modes of the process over a twenty-four period. The day class template is displayed on the graphical user interface. The day class template includes a time category displayed adjacent to a mode category. The time category further depicts a plurality of indicators that are chronologically arranged to represent selected times within a twenty-four hour period. Upon receipt of a definition of an interval of time from a user, the interval of time is displayed pursuant to the definition on the day class template. Upon receipt of a specification of a mode of operation of the process during the interval of time, a representation of the mode of operation of the process is displayed on the day class template. The process is operated pursuant to the specified mode of operation during the interval of time. Advantageously, the present invention allows a person generally unfamiliar with computer programming and with programming languages and techniques to readily define the mode of operation of a computer controlled process during a twenty-four period. Further, the present invention allows such a person to readily review the information contained in the day class template and quickly deduce the schedule of mode operation during the relevant twenty-four period.

In the preferred embodiment of the present invention, the user can change the definition of the interval of time by providing a different definition. In response to receiving the different definition for the interval of time, the present invention changes the display of the interval of time on the day class template to reflect the different definition. Then, in response to the changed interval of time, the process is operated pursuant to the specified mode of operation during the changed interval of time. Also in the preferred embodiment, the user can change the mode of operation of the process during the interval of time by providing a different specification for the different mode of operation. In response to receiving the different specification, the present invention changes the display of the representation of the mode of operation on the day class template to reflect the different mode. Then, in response to the changed representation, the process is operated pursuant to the different mode of operation during the interval of time. The preferred process is a service of an advanced intelligent network and operation of the process includes operation of the advance intelligent network service pursuant to the mode of operation during the interval of time. Advantageously, the present invention readily allows a user to redefine an interval of time for operation of a specific mode of the process or to change the mode of operation to a different mode.

The preferred embodiment of the present invention allows the user to define more than one interval of time and more than one mode of operation of the process for the relevant twenty-four hour period. The present invention is receptive to a definition for a second interval of time from the user. In response to receiving the second definition, the second interval of time is displayed on the day class template pursuant to the second definition. The present invention also is receptive to a specification of a second mode for operation during the second defined interval of time. In response to receiving the specification of the second mode of operation, a representation of the second mode of operation is displayed on the day class template. Then, the process is operated pursuant to the specified second mode of operation during the second defined interval of time. Advantageously, the present invention readily allows a user to define more than one mode of operation of the process during the relevant twenty-four period. Preferably, the process is operated pursuant to a default mode of operation at times other than the specified interval of time(s) in the day class template.

More particularly described, the preferred embodiment of the present invention is receptive to a definition for the interval of time including a start time and an end time for the interval. The start and end times are displayed on the day class template. Further, the present invention preferably receives a start time for the interval by receiving a first signal corresponding to a first indicator of the plurality of indicators chronologically arranged to represent selected times within a twenty-four hour period in the time category of the day class template. The start time is displayed by distinguishing the first indicator from the other indicators. Similarly, the present invention preferably receives an end time for the interval by receiving a second signal corresponding to a second indicator of the plurality of indicators. The end time is displayed by distinguishing the second indicator from the other indicators. In addition, the present invention preferably distinguishes all indicators that are chronologically displayed between the first indicator and the second indicator. Advantageously, the display of start and end times based on the distinguishment of the first indicator and second indicator on the day class template readily communicates to the user the schedule of the mode of operation of the process during the relevant twenty-four hour period.

Even more particularly described, the preferred embodiment is receptive to a start time and/or an end time where the start time indicator and/or the end time indicator are different from the plurality of indicators chronologically arranged to represent selected times within a 24-hour period. These start time and end time indicators are displayed by chronologically positioning the respective start time and end time indicators among the chronologically-arranged plurality of indicators.

The preferred embodiment also includes a mode category that defines at least one mode block that is displayed in correspondence to the definition of the interval of time. In particular, a mode block is preferably defined with respect to the start time for the interval by a first reference to the first indicator of the plurality of indicators and with respect to an end time for the interval by a second reference to a second indicator. Further, in the preferred embodiment, the first reference is a first graphic image such as a line displayed in the mode category as a first side of the mode block that extends perpendicularly from the first indicator across the mode category. Similarly, the second reference is a second graphic image such as a line displayed in the mode category as a second side of the mode block that extends perpendicularly from the second indicator across the mode category. The mode category may define a second or more mode blocks in correspondence to the number of intervals of time displayed on the day class template.

The mode block is preferably distinguished from the remainder of the mode category. Further, the preferred embodiment displays the representation of the mode of operation by the displaying the representation within the mode block. The mode block is useful in the preferred embodiment in changing the interval of time. The interval of time is changed to a changed interval of time on the day class template by changing the mode block to a changed mode block on the day class template.

The preferred embodiment also provides for each day class template to be assigned a designation or name by the user. The present invention receives a particular designation and displays the designation on the day class template. In this manner, the designation is readily read by the user from the day class template displayed on the graphic user interface.

The preferred embodiment also provides a calendar of days or day blocks for use in displaying the schedule for the operational modes of the process over a longer period than twenty-four hours. Each of the days of the calendar is assigned a preselected designation. A day class template also is assigned to a day of the plurality of days based on a correspondence between the designation of the day class template and the preselected designation of that day. The calendar is displayed to reflect the assignation of the day class template to the day by depicting each of the day blocks corresponding to the day assigned the day class template differently from the other day blocks of the calendar.

The present invention also provides a system and method for indicating the general schedule of operation of a process over a predetermined period of time in a system including a computer that provides for user input through a graphical user interface. A calendar of days representing the predetermined period of time is displayed on the graphical user interface. A day class is defined by the user. The day class represents a schedule of operation of the process during a 24-hour period. Each day of the calendar on which the schedule of operation of the process is to be followed is assigned to the day class. Each day of the calendar assigned to the day class is depicted differently from other days of the calendar not assigned to the day class. Preferably, a second day class is defined by the user. The second day class represents a second schedule of operation of the process during a different 24-hour period. Each day of the calendar on which the second schedule of operation of the process is to be followed is assigned to the second day class. Each day assigned to the second day class is depicted differently from the days assigned to the first day class and from other days of the calendar not assigned to the first day class or the second day class. Advantageously, the user readily determines the schedule of mode operation during the period corresponding to the calendar by simply reviewing the different depictions of the days on the calendar.

In addition, the present invention is preferably receptive to a selection of a particular day of the calendar from the user. In response to the selection of the particular day, the present invention displays on the graphical user interface a day class template corresponding to the day class of the particular day. The displayed day class template specifies an interval of time and a mode of operation of the process during the interval of time. In response to input by the user, the interval of time for the mode of operation of the process may be changed. In response to changing the interval of time, the display of the representation of the interval of time is changed to reflect the change in the interval of time. In response to input by the user, the mode of operation of the process during the interval of time is changed. In response to changing the mode of operation of the process, the display of the symbol of the mode of operation is changed to reflect the change in the mode of operation.

Therefore, it is an object of the present invention to provide an improved method and an improved system for providing a temporal interface for use in the implementation of a process.

It also is an object of the present invention to provide a method and system for providing a temporal interface for use in the implementation of a process that does not require a familiarity with computer programming and with programming languages and techniques.

In addition, it is an object of the present invention to provide a method and system for providing a temporal interface for use in the implementation of a process that is efficient, easy and quick to create, to read and to use.

It is a further object of the present invention to provide a method and system for providing a temporal interface for use in the implementation of a process that is intuitive to create, to read and to use.

It also is an object of the present invention to provide a method and system for providing a method and system for providing a temporal interface for use in the implementation of a process that readily provides significant information to the user.

In addition, it is an object of the present invention to provide a method and system for providing a temporal interface for use in the implementation of a process that readily provides scheduling information about mode operation over a period of time such as a week, month or year.

Other objects, features, and advantages of the invention will become apparent upon review of the following detailed description of an embodiment of the invention, when taken in conjunction with the drawing and the appended claims.

BRIEF DESCRIPTION OF THE DRAWINGS

FIG. 5A illustrates a calendar as used on the graphical interface in the preferred embodiment of the present invention.

FIG. 5C depicts an example of a "Weekday" day class template as used in connection with the calendar of FIG. 5A.

Fig. 5D depicts an example of a "Weekend" day class template as used in connection with the calendar of FIG. 5A.

Fig. 5E depicts an example of a "Holiday" day class template as used in connection with the calendar of Fig. 5A.

Fig. 5F depicts an example of an "Other" day class template as used in connection with the calendar of Fig. 5A.

DETAILED DESCRIPTION

Nomenclature of the Specification

Figure 1:
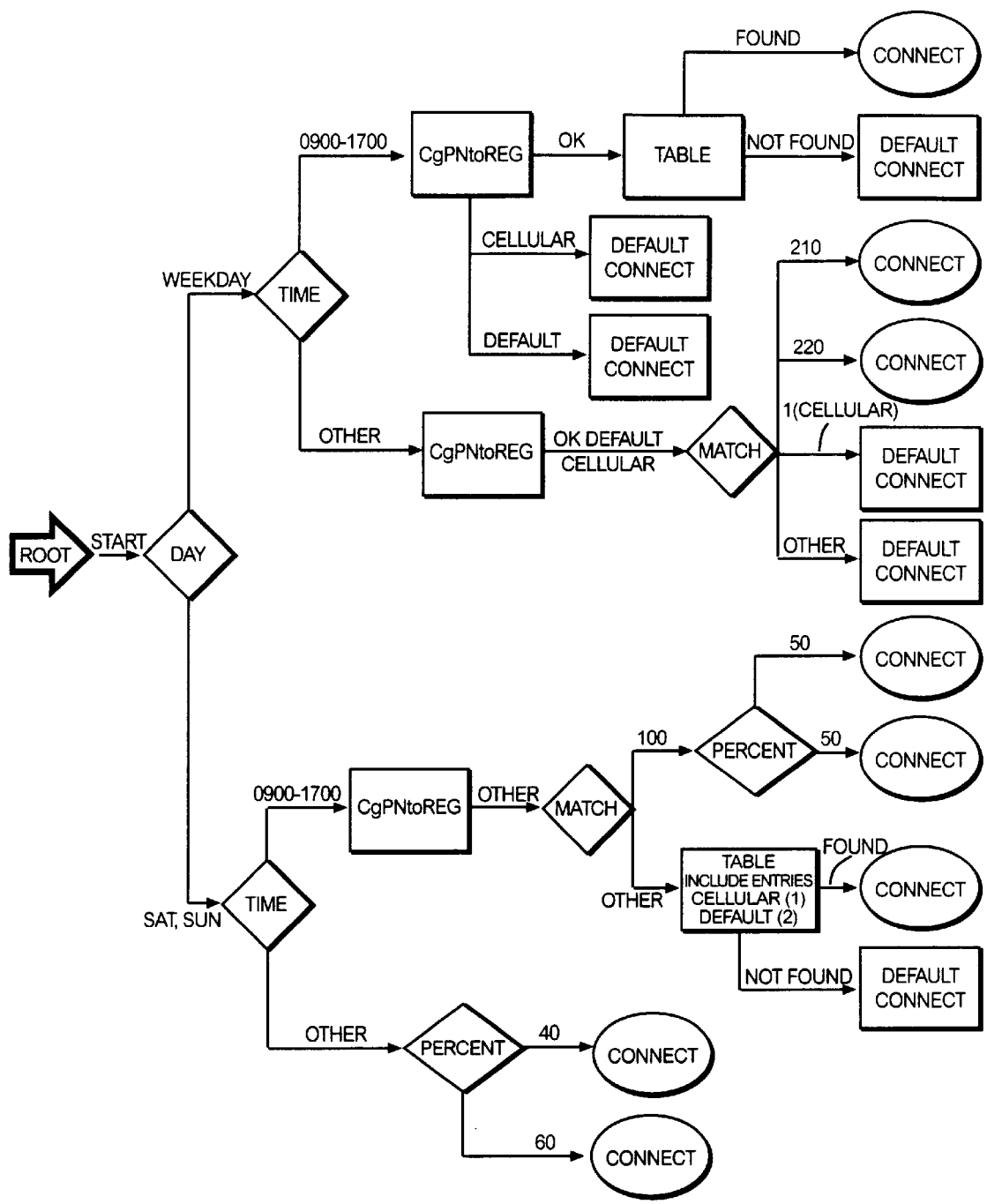
FIG. 1 is an example of a decision graph file such as may be used with the Area Number Calling service.
Figure 2:
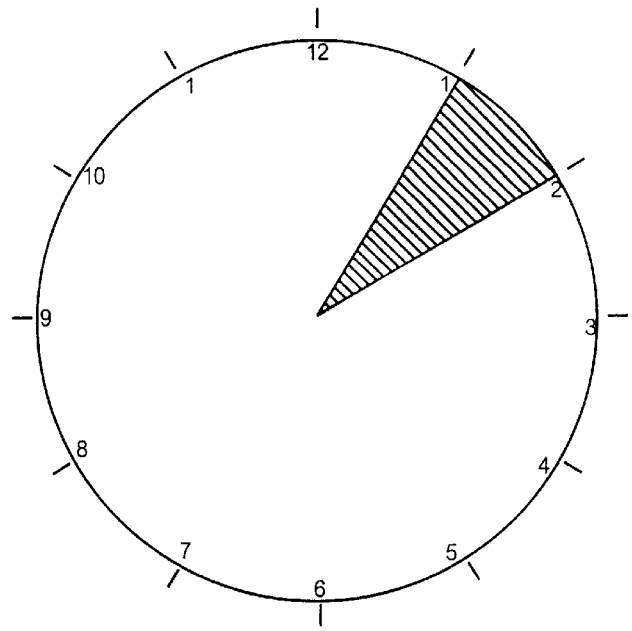
FIG. 2 is an example of a 12 hour clock face graphical user interface.

Turning first to the nomenclature of the specification, the detailed description which follows is represented largely in terms of methods and symbolic representations of operations by computer components. These methods generally require physical manipulations of physical quantities. Usually, though not necessarily, these quantities take the form of electrical, magnetic, or optical signals capable of being stored, transferred, combined, compared or otherwise manipulated. It is conventional for those skilled in the art to refer to these signals as bits, values, elements, symbols, characters, terms, numbers, records, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referenced with terms that are often associated with manual operations performed by a human operator. Such terms include adding, comparing, moving, etc. It should be understood that involvement of a human operator is unnecessary nor even desirable with respect to all steps or elements of the present invention. The operations described herein are generally machine operations performed in conjunction with a human operator or user that interacts with the computer. The machines used for performing the operation of the present invention, as will be understood, include general purpose digital computers or other similar computing devices and elements as used with a modern public switched telephone network commonly referred to as the advanced intelligent network ("AIN").

In addition, unless otherwise specified, it should be understood that the program, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

General Description of the Preferred Embodiment

Referring now to the drawings, in which like numerals represent like elements throughout the several figures, the present invention and the preferred operating environment will be described.

Generally stated, the present invention is a system and method for defining and depicting the operational mode of a process based on temporal factors in a system including a computer that provides for user input through a graphical user interface. A day class template is displayed on the graphical user interface. The day class template includes a time category displayed adjacent to a mode category. The time category further depicts a plurality of indicators that are chronologically arranged to represent selected times within a twenty-four hour period. Upon receipt of a definition of an interval of time from a user, the interval of time is displayed pursuant to the definition on the day class template. Upon receipt of a specification of a mode of operation of the process during the interval of time, a representation of the mode of operation of the process is displayed on the day class template. The process then is operated pursuant to the specified mode of operation during the interval of time. Further, the preferred embodiment provides a calendar including day blocks. The calendar is used to facilitate the scheduling and display of modes of operation of the relevant process over a period of time longer than a day. The preferred calendar is displayed so that days on the calendar that run a particular schedule of the process (as defined by a day class template and also referred to as a "day class") are distinguished from other days on the calendar.

The preferred embodiment of the present invention is described herein in the context of its use with the telecommunications service "Area Number Calling" that is referenced above in the background to this invention. It should be appreciated the present invention is applicable to other processes as well and is not to be limited to telecommunication services or to the Area Number Calling service in particular.

The preferred embodiment is described first from the perspective of a new subscriber to the Area Number Calling service, who is providing the service provider with the desired parameters of operation of the ANC service. These parameters generally define the modes of operation of the Area Number Calling service and the schedule for the operation of these modes. These parameters are entered into the system supporting the ANC service preferably through use of the present invention. Further, these parameters are graphically depicted through use of the present invention to provide information to the user and/or subscriber regarding the schedule for the operational modes of the ANC service. The preferred embodiment is further described from the perspective of the operation of the system with respect to the creation and editing of a day class template, and with respect to the interaction of a user in the display of the calendar and the display of a particular day class template assigned to a day block on the calendar.

Definition of the Modes of Operation

Generally, a user of the present invention will already have a definition of and implementation procedures for each mode of operation of the relevant process. The user also will already have a designation or name for each such mode. A new subscriber to the ANC service has to provide such definitional information so that the desired modes of operation of the ANC service are set up. This is explained in the Area Number Calling patent application in the context of setting up one or more maps to be used as a geographic basis for the routing of telephone calls to the subscriber's Area Number Calling number. As an example for the purpose of the present application, it is sufficient to say that the new ANC subscriber has already provided the service provider with definitions for two different modes of operation ("Map 1" and "Map 2") through use of a Mode/Region Assignment Table. .

Figure 3:
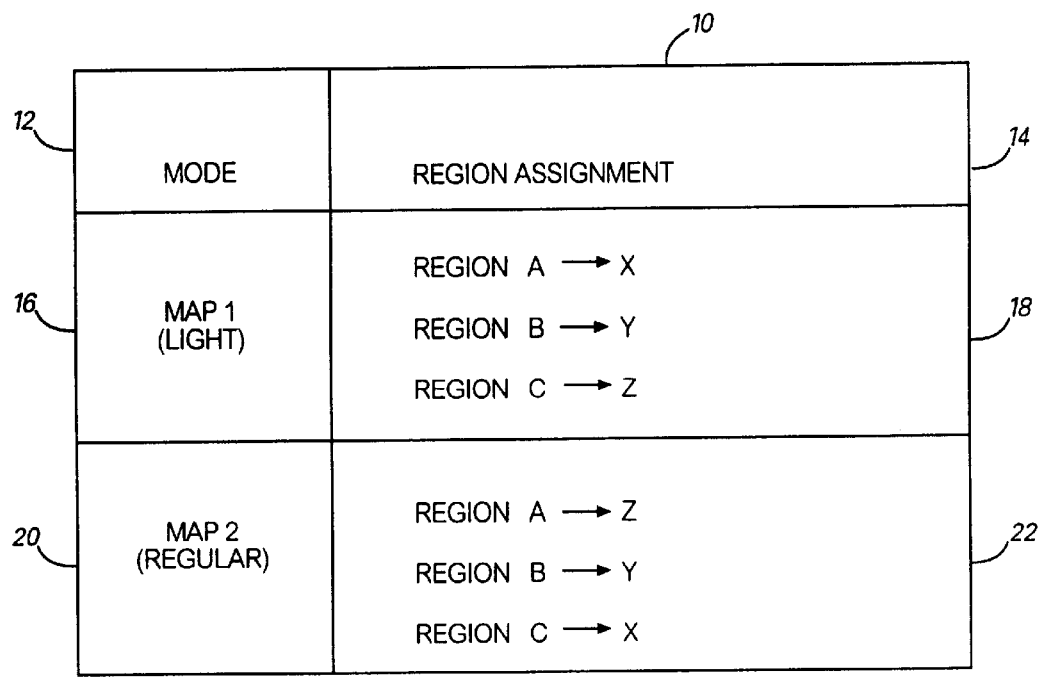
FIG. 3 is a table illustrating the mode/region assignments for operation of two different modes of the Area Number Calling service for a particular subscriber.

FIG. 3 illustrates an example of a Mode/Region Assignment Table 10 for display on a graphical user interface such as may be used with the preferred embodiment in the Area Number Calling service. Mode/Region Assignment Table 10 includes a mode column 12 and a region assignment column 14. The first entry 16 in the mode column is a mode that is specified as "Map 1". The subscriber in our example has defined a first mode of operation specified as "Map 1" or "Light" to reflect the routing of calls to the Area Number Calling number based on a certain geographic distribution that the subscriber believes works best for "light" business hours. The first entry 18 in the region assignment column 14 includes a readily understood denomination of the routing pattern for calls during the "Map 1" mode. Pursuant to the "Map 1" mode, calls received from "Region A" are routed to location "X", calls received from "Region B" are routed to location "Y", and calls received from "Region C" are routed to location "Z". The second entry 20 in the mode column is a mode that is specified as "Map 2". The subscriber has defined a second mode of operation specified as "Map 2" or "Regular" to reflect the routing of calls to the Area Number Calling number based on a certain geographic distribution that the subscriber believes works best for "regular" business hours. The second entry 22 in the region assignment column 14 includes a readily understood denomination of the routing pattern for calls during the "Map 2" mode. Pursuant to the "Map 2" mode, calls received from "Region A" are routed to location "Z", calls received from "Region B" are routed to location "Y", and calls received from "Region C" are routed to location "X".

As noted, the Mode/Region Assignment Table 10 provides a readily understood display of the definitions of the modes of operation of the relevant process. Implementation of the modes of operation as defined in the table is specific to the relevant process. Implementations of the modes of operation are irrelevant to the present application except insofar as the schedule of the modes of operation of the process are defined and controlled through use of the present invention. The reader is referred to the Area Number Calling service patent application for implementation of the modes of operation of that service.

Description of a Day Class Template

To define the schedule of mode operation of the relevant process for a certain twenty-four period, the user provides information through the use of a computer, and in particular, through the use of the computer's graphical user interface. In the present invention, the schedule is defined through the use of a day class template that is displayed on the graphical user interface. FIG. 4A illustrates a "blank" day class template 30 pursuant to the preferred embodiment of the present invention. In the present invention, a day class template is used to define the schedule of the modes of operation of the relevant process for a particular twenty-four hour period. This schedule depicted on the day class template is used to control the mode operation of a relevant process as will be explained below. The day class template in FIG. 4A is referred to as "blank" because no intervals of time have been displayed on the template nor have any mode representations been displayed on the template.

As illustrated in FIG. 4A, day class template 30 includes a time category 32 displayed adjacent to a mode category 34. Preferably, day class template 30 also includes a designation 36 or name for the particular day class schedule of the mode of operation of the relevant process such as the illustrated "NormalWeekday". As further illustrated in FIG. 4A, in the preferred embodiment, time category 32 is depicted as a vertical column and mode category 34 is depicted as vertical column adjacent to the vertical column of time category 32. Time category 32 also depicts a plurality of indicators 38a–38x that are chronologically arranged in a vertical column to represent selected times within a twenty-four hour period. Preferably, indicators 38a–38x represent the twenty-four hours in a day in military time beginning with "0" indicator 38a representing 12:00 A.M. through "23" indicator 38x representing 11:00 P.M. Alternatively, the plurality of indicators 38a–38x may represent the twenty-four hours in a day, but include separate indicators for A.M. and P.M., to-wit: 12:00 A.M. through 11:00 A.M. and 12:00 P.M. through 11:00 P.M.

Alternatively, day class template 30 may include time and mode categories that are displayed respectively as adjacent horizontal rows. FIG. 4B illustrates an alternative day class template pursuant to an embodiment of the present invention depicting such horizontal rows. The reference numerals in FIG. 4B correspond to the reference numerals, and thus, to the elements of the day class template illustrated in FIG. 4A, except that the reference numerals of FIG. 4B are marked with a "prime" symbol to indicate the different figures.

As noted above, the day class template 30 illustrated in FIG. 4A is a "blank" template in that no modes of operation of the relevant process have been defined on the template. To define a mode of operation, the user first defines an interval of time preferably by providing a start time and an end time. In the preferred embodiment, the user uses an input device such as a mouse to select one of the plurality of indicators representing a certain hour during the twenty-four hour period as the start time for the interval of time. Similarly, the user selects another of the plurality of indicators representing a particular hour as the end time for the interval of time. It will be clear to the reader that the start time for an interval of time should be followed chronologically by the end time for the interval. As an alternative to the selection of a pair of indicators through the use of an input device, the user may input the start and end times for the interval through input interaction with a dialog box or other graphical user interface mechanism such as are well known to those skilled in the art. Preferably, the result of the definition of the time interval is that a representation of the time interval based on the definition is displayed on the day class template.

Figure 4D:
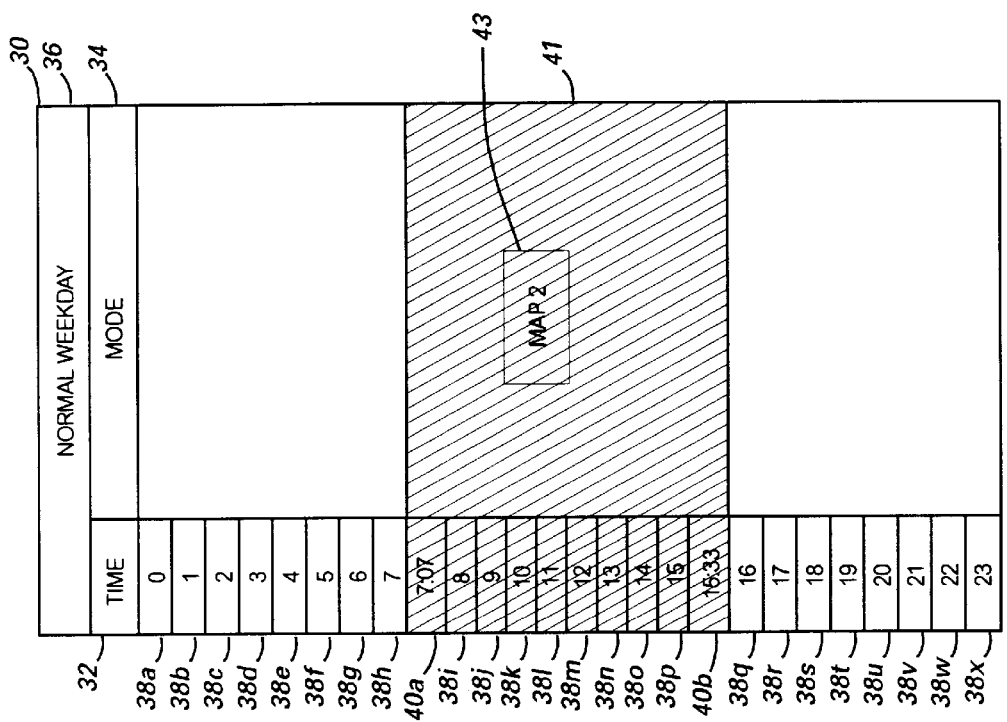
FIG. 4D illustrates an alternative display of an interval of time on the day class template shown in FIG. 4A.
Figure 4C:
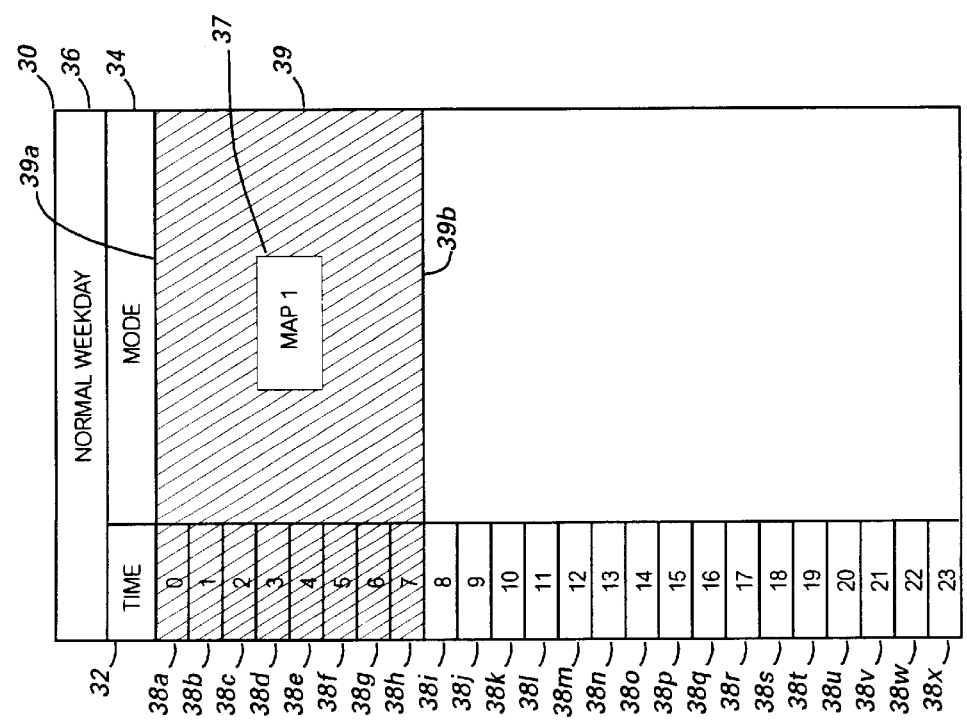
FIG. 4C illustrates the display of an interval of time on the day class template shown in FIG. 4A.

Description of the Definition and Display of an Interval of Time and Mode on a Day Class Template FIG. 4C illustrates the display of an interval of time on the day class template 30 shown in FIG. 4A. The user has defined the start time of the interval with reference to the indicator "0" 38a in the time category 32 of day class template 30. In the preferred embodiment, a start time with reference to the indicator "0" 38a corresponds to a start time of 12:00 A.M. The user also has defined the end time of the interval with reference to the indicator "7" 38h in the time category 32. In the preferred embodiment, an end time with reference to the indicator "7" 38h corresponds to an end time of 7:59 A.M. The result of this definition of a time interval is that the time interval between 12:00 A.M. and 7:59 A.M. is displayed on the day class template 30. A further result of this definition of a time interval is that the relevant process will be operated pursuant to a specified mode during the defined interval of time. As illustrated in FIG. 4C, the process will be operated from 12:00 A.M. through 7:59 A.M. pursuant to the MAP 1 mode as indicated by the MAP 1 representation 37

As illustrated in FIG. 4C, the display of the defined interval on the day class template 30 is accomplished in part by distinguishing indicator "0" 38a, indicator "7" 38h and all of the indicators ("1"–"6", 38b–38g) that are chronologically positioned between indicator "0" 38a and indicator "7" 38h. Advantageously, this display of the interval of time provides the user with a ready and intuitive grasp of the schedule of mode operation of the process. Alternatively, the display of the defined interval may be accomplished in part by distinguishing only the start time indicator "0" 38a and the end time indicator "7". The distinguishment of the referenced indicators 38a–38g is shown in FIG. 4C by cross hatching to indicate that the background area of the day class template 30 corresponding to the referenced indicators is a different color or shade from the remaining area of the day class template 30. Although the preferred embodiment uses color to distinguish indicators, it will be appreciated there are many other equivalent ways of distinguishing indicators such as displaying the distinguished indicators in a different font from other indicators. In addition, the present invention optionally provides the user with the opportunity to select the particular distinguishments. Such selection may be accomplished through the use of pull down menus, dialog boxes, or other graphical user interface mechanisms that are well known to those skilled in the art. For example, the user may choose to distinguish the indicators by providing a "blue" background color to these indicators.

Also as illustrated in FIG. 4C, the display of the defined interval on the day class template 30 is further accomplished by distinguishing a mode block 39 in mode category 34 that is adjacent to indicators 38a–38h in time category 32. This mode block 39 corresponds to the definition of the interval of time. In particular, mode block 39 is defined by reference to start time indicator 38a and by reference to end time indicator 38h. As illustrated, the reference to start time indicator 38a is the graphic image of the line 39a that provides a top side or border to mode block 39. The reference to the end time indicator 38h is the graphic image of the line 39b that provides a bottom side or border to mode block 39. The top line 39a and the bottom line 39b define mode block 39 as a rectangular area within mode category 34. Alternatively, lines 39a, 39b are not depicted as distinct graphic images, but rather, bear the same distinguishment as the interior area of mode block 39. In other words, lines 39a, 39b alternatively are defined simply as the respective borders of mode block 39. Thus, as shown in FIG. 4C, the present invention preferably displays the interval of time by distinguishing the indicators 38a–38h that correspond to the definition of the time interval, by defining a mode block 39 in the mode category 34 corresponding to the indicators 38a–38h, and by distinguishing the mode block 39 generally in the same manner as the indicators 38a–38h are distinguished. In addition, the present invention optionally provides the user with the opportunity to select the particular distinguishments used for the indicators or mode blocks. For example, the user may choose to distinguish the indicators and mode blocks by providing a "blue" background color to these indicators and mode blocks.

FIG. 4C further illustrates the display of a representation 37 of the mode of operation of the process during the interval of time displayed on the day class template 30. Preferably, once the user has defined the interval of time and it has been displayed on the day class template, the user uses an input device to specify the mode of operation of the process during that interval. This may be accomplished by selecting the mode block 39 and typing a representation for the mode through use of the keyboard, or through some other user input interaction with a dialog box or other graphical user interface mechanism. With respect to the Area Number Calling service, a Mode/Region Assignment Table such as illustrated in FIG. 3 may be used to select and specify the mode of operation. As illustrated in FIG. 4C, "MAP 1" is the representation 37 of the mode of the process that is operated during the defined time interval.

FIG. 4D illustrates another alternative display of an interval of time on the day class template 30 shown in FIG. 4A. In an embodiment of the present invention, the user may define the interval of time with reference to a start time and an end time that are not represented by any of the plurality of indicators 38a–38h. For example, a user may choose to define a start time as 7:07 A.M. and an end time as 15:33. However, neither of these times specifically correspond to any of the plurality of indicators 38a–38h. The day class template does not include representations of all possible segments of time because such representation may be impossible, and would unnecessarily complicate the day class template making it too large for efficient use and ready readability. Thus, the user is unable to merely select either of the desired times (7:07 A.M. and 15:33 ) from the time category 32. To remedy this problem, an embodiment of the present invention allows the user to define start and end times with specificity to a start time indicator and an end time indicator that is input through the use of a conventional dialog box or other well known graphical user interface mechanism. As noted above, this input option also is available to the user as a means of defining the interval of time with reference to times that are represented by the plurality of indicators 38a–38x.

Upon receiving a start time indicator that is different from the plurality of indicators, an embodiment of the present invention displays the start time indicator in a position that is chronologically correct with respect to the plurality of indicators. Similarly, upon receiving an end time indicator that is different from the plurality of indicators, an embodiment of the present invention displays the end time indicator in a position that is chronologically correct with respect to the plurality of indicators. As illustrated in FIG. 4D, the interval of time has been defined with a start time of 7:07 A.M., which is represented by start time indicator 40a. The start time indicator 40a has been positioned in its proper chronological place between the indicator 38h for 7:00 A.M. and the indicator 38i for 8:00 A.M. The interval has been further defined to have an end time of 15:33, which is represented by end time indicator 40b. The end time indicator 40b has been positioned in its proper chronological place between the indicator 38p for 15:00 and the indicator 38q for 16:00. Advantageously, this display of the interval of time based on specifically defined start and end times provides the user with a ready and intuitive grasp of the schedule of mode operation of the relevant process.

As with the display of the interval of time using certain indicators of the plurality of indicators 38a–38x as shown in FIG. 4C, the display of the interval of time based on specifically defined start and end times using indicator "7:07" 40a and indicator "15:33" 40b is accomplished in part by distinguishing these indicators 40a, 40b and all of the indicators ("8"–"15", 38i–38p) that are chronologically positioned between indicator "7:07" 40a and "15:33" 40b.

Alternatively, the display of the defined interval may be accomplished in part by distinguishing only the start time indicator "7:07" 40*a* and the end time indicator "15:33" 40*b*. The distinguishment of the referenced indicators 40*a*, 38*i*–38*p*, 40*b* is shown in FIG. 4D by cross hatching to indicate that the background area of the day class template 30 corresponding to the referenced indicators is a different color or shade from the remaining area of the day class template 30. As noted, although the preferred embodiment uses color to distinguish indicators, it will be appreciated there are many other equivalent ways of distinguishing indicators such as displaying the distinguished indicators in a different font from other indicators.

As further illustrated in FIG. 4D, the display of the specifically defined interval on day class template is also accomplished by distinguishing a mode block 41 in mode category 34 to correspond to the referenced indicators 40*a*, 38*i*–38*p*, 40*b*. In addition, FIG. 4D illustrates the display of a representation 41 "MAP 2" of the mode of operation of the process during the interval displayed on the day class template 30.

Figure 4F:
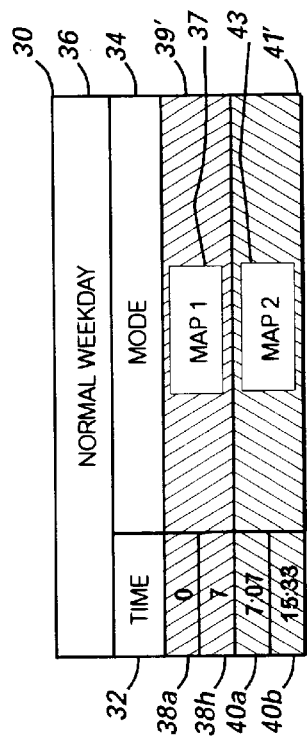
FIG. 4F illustrates an alternative embodiment of the day class template pursuant to an alternate embodiment of the present invention.
Figure 4E:
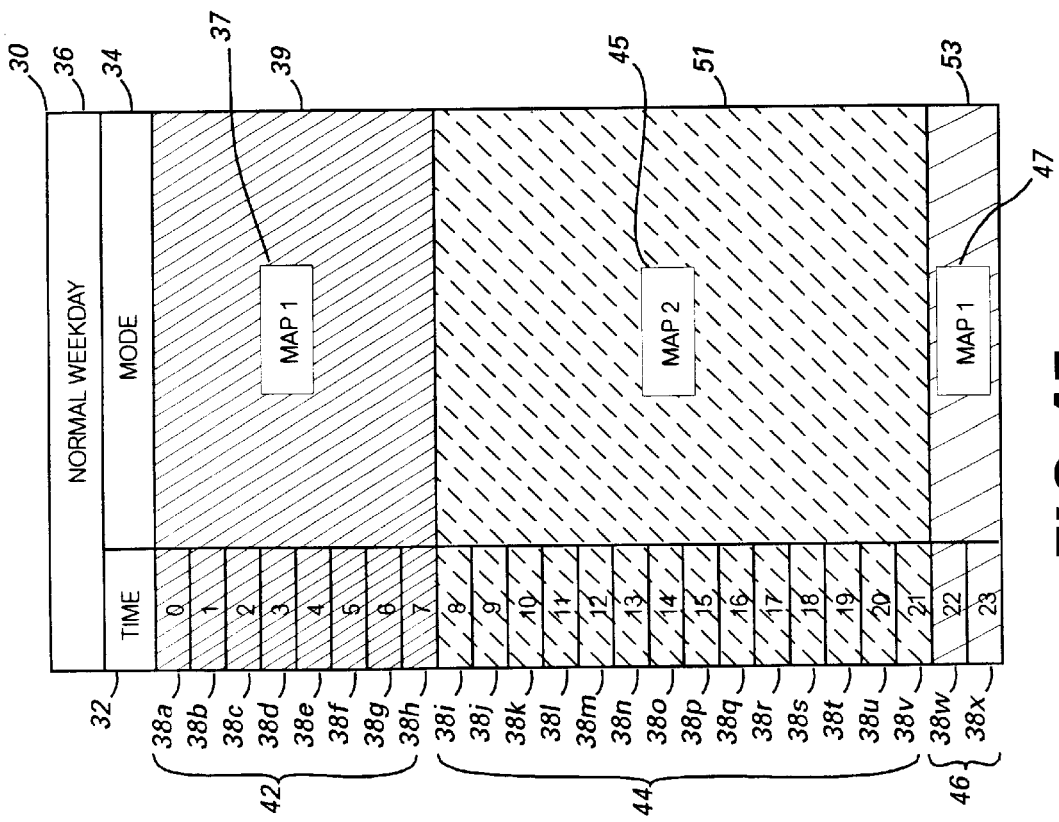
FIG. 4E illustrates the display of three different intervals of time on the day class template shown in FIG. 4A.

FIG. 4E illustrates a display of three different intervals of time on the day class template shown in FIG. 4A. In the preferred embodiment, the user may define more than one interval of time on a day class template. As a result, the process is operated pursuant to the respective specified and represented modes of operation during each of the defined intervals of time. The condition to the definition of more than one interval of time during a particular twenty-four hour period is that none of the intervals overlap. An overlap of intervals would cause confusion as to mode operation during the overlap period. In an embodiment, in case of an overlap, the process is operated pursuant to a default mode of operation that is specified or defined by the user.

As illustrated in FIG. 4E, three intervals of time have been defined by the user and displayed on the day class template 30. The first interval of time 42 has a start time of 12:00 A.M. as indicated by the distinguishment of "0" indicator 38*a*, and an end time of 7:59 A.M. as indicated by the distinguishment of "7" indicator 38*h*. The first interval of time 42 is readily determined even with a cursory glance by a user based on the distinguishment of these start time and end time indicators 38*a*, 38*h* and all of the indicators ("1"–"6", 38*b*–38*g*) that are chronologically positioned between indicator "0" 38*a* and indicator "7" 38*h*. The distinguishment of the referenced indicators 38*a*–38*h* is shown in FIG. 4E by cross hatching to indicate that the background area of the day class template 30 corresponding to the referenced indicators is a different color or shade from the remaining areas of the day class template 30. The first interval of time 42 is determined easily also because of the distinguishment of the mode block 39 that corresponds to the indicators 38*a*–38*h*. As illustrated in FIG. 4E, mode block 39 is distinguished from the remainder of mode category 34 in the same manner that indicators 38*a*–38*h* are distinguished from the other indicators of time category 32. In addition, FIG. 4E illustrates the display of a representation 37 "MAP 1" of the mode of operation of the process during the interval displayed on the day class template 30.

On the template illustrated in FIG. 4E, the second interval of time 44 has a start time of 8:00 A.M. as indicated by the distinguishment of "8" indicator 38*i*, and an end time of 21:59 as indicated by the distinguishment of "21" indicator 38*v*. The second interval of time 44 is readily determined based on the distinguishment of these start time and end time indicators 38*i*, 38*v* and all of the indicators ("9"–"20", 38*i*–38*v*) that are chronologically positioned between indicator "8" 38*i* and indicator "21" 38*v*. The distinguishment of the referenced indicators 38*i*–38*v* is shown in FIG. 4E by a different type of cross hatching from the cross hatching of the first interval 42 so as to indicate that the background area of the day class template 30 corresponding to the referenced indicators is a different color or shade from the remaining areas of the day class template 30. The second interval of time 44 is determined easily also because of the distinguishment of the mode block 51 that corresponds to the indicators 38*a*–38*h*. As illustrated in FIG. 4E, mode block 51 is distinguished from the remainder of mode category 34 in the same manner that indicators 38*i*–38*v* are distinguished from the other indicators of time category 32. In addition, FIG. 4E illustrates the display of a representation 45 "MAP 2" of the mode of operation of the process during the interval displayed on the day class template 30.

The third interval of time 46 has a start time of 22:00 as indicated by the distinguishment of "22" indicator 38*w*, and an end time of 23:59 as indicated by the distinguishment of "23" indicator 38*x*. The third interval of time 46 is readily determined based on the distinguishment of these start time and end time indicators 38*w*, 38*x*. The distinguishment of the referenced indicators 38*w*–38*x* is shown in FIG. 4E by cross hatching to indicate that the background area of the day class template 30 corresponding to the referenced indicators is a different color or shade from the remaining areas of the day class template 30. The third interval of time 46 is determined easily also because of the distinguishment of mode block 53 that corresponds to the indicators 38*w*–38*x*. As illustrated in FIG. 4E, mode block 53 is distinguished from the remainder of mode category 34 in the same manner that indicators 38*w*–38*x* are distinguished from the other indicators of time category 32. In addition, FIG. 4E illustrates the display of a representation 47 "MAP 1" of the mode of operation of the process during the interval displayed on the day class template 30.

Advantageously, a user may simply glance at the day class template 30 illustrated in FIG. 4E to readily determine the schedule of operation for the relevant process during the specified twenty-four hour period. As illustrated, during the particular twenty-four period, the process operates pursuant to mode "MAP 1" from 12:00 through 7:59, pursuant to mode "MAP 2" from 8:00 through 21:59, and then pursuant to mode "MAP 1" from 22:00 through 23:59.

In an embodiment, the process is operated pursuant to a default mode of operation at times other than the interval(s) of time defined and displayed on the day class template. The default mode of operation must be defined by the user at the time of system set up, or as redefined as necessary or desirable.

Another alternative embodiment of the day class template 30 of the present invention is illustrated in FIG. 4F. In this embodiment, the intervals of time are defined on the template only by reference to a start time and an end time. In this manner, the depiction of the day class template 30 can be made smaller in size than the template illustrated in FIG. 4C. These space saving advantages derive from the elimination of the depiction of the indicators "in-between" the start and end time indicators such as used in the template of FIG. 4C. Such a smaller display may be particularly useful for a user that has a crowded computer screen with which to work. In particular, FIG. 4F illustrates a first interval of time defined by a start time with reference to indicator "0" 38*a* and an end time with reference to indicator "7" 38*h*. There are no other indicators displayed between this start time indicator "0" 38*a* and end time indicator "7" 38*h*. The referenced indicators 38*a*, 38*h* are preferably distinguished from any other indicators that appear on the template 30. In addition, the display of the first interval of time is accomplished by distinguishing a mode block 39' in mode category 34 to correspond to the referenced indicators 38a, 38h. In addition, FIG. 4E illustrates the display of a representation 37 "MAP 1" of the mode of operation of the process during the interval displayed on the day class template 30. Similarly, FIG. 4F illustrates a second interval of time defined by a start time with reference to indicator "7:07" 40a and an end time with reference to indicator "15:33" 40b. There are no other indicators displayed between this start time indicator "7:07" 40a and end time indicator "15:33" 40b. The referenced indicators 40a, 40b are preferably distinguished from any other indicators that appear on the template 30. In addition, the display of the second interval of time is accomplished by distinguishing a mode block 41' in mode category 34 to correspond to the referenced indicators 40a, 40b. In addition, FIG. 4E illustrates the display of a representation 43 "MAP 1" of the mode of operation of the process during the interval displayed on the day class template 30.

Description of the Change in the Definition and Display of an Interval of Time and Mode on a Day Class Template In the preferred embodiment, the user is not locked into a schedule of mode operation as defined by the day class template. The user may change the schedule of operation of the process by changing the definitions of the time interval (s) or by changing the specifications of the modes of operation. In response to receiving a different definition for a particular time interval, the present invention changes the display of the time interval by displaying the changed interval of time on the day class template. In response to the changing of the interval of time, the process is operated pursuant to the specified mode of operation during the changed interval of time. In response to receiving a different specification for a particular mode of operation, the present invention changes the display of the representation of the mode of operation on the day class template. In response to the changing of the mode of operation, the process is operated to the changed mode of operation during the relevant interval of time.

Figure 4H:
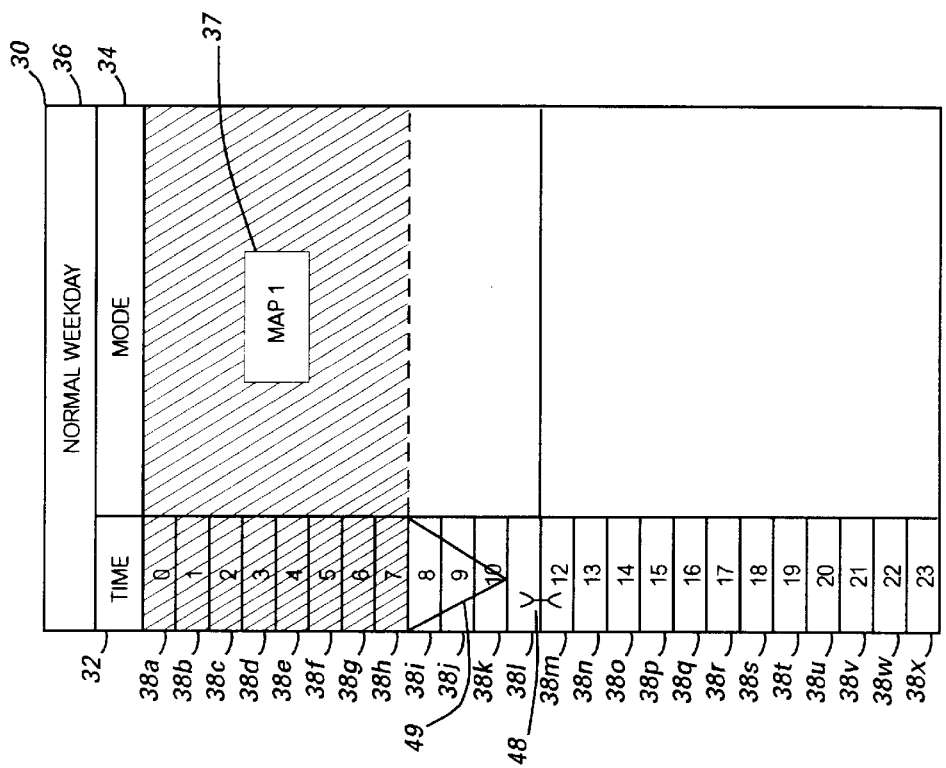
FIG. 4A illustrates a day class template pursuant to the preferred embodiment of the present invention.
FIG. 4B illustrates an alternative day class template pursuant to an embodiment of the present invention.
Figure 4G:
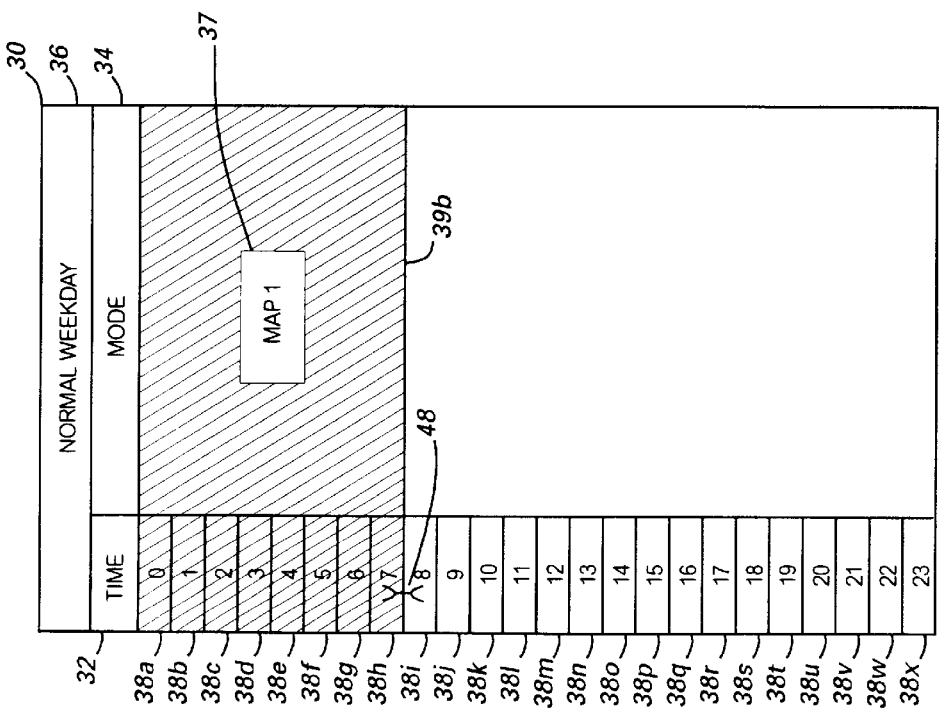
Figure 4I:
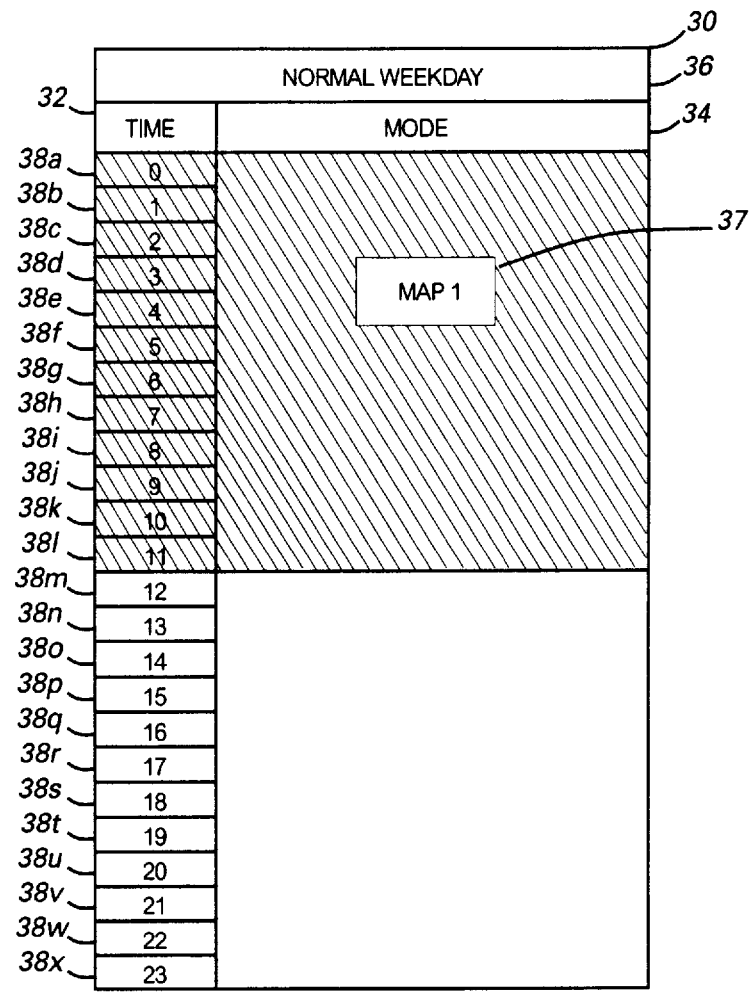

FIGS. 4G, 4H and 4I illustrate the changing of a time interval on the day class template shown in FIG. 4A. In particular, FIG. 4G illustrates an interval of time that corresponds to a time period from 12:00 through 7:59 and that has been displayed by reference to indicators 38a through 38h. To change this interval of time by lengthening it to extend through 11:59, the user uses the cursor 48 to select the "7" indicator 38h and drags through the indicators "8" 38i, "9" 38j, and "10" 38k to indicator "11" 38l where the drag ends. These selection and drag steps provide the invention with a different definition for the interval of time. FIG. 4H illustrates cursor 48 as it has been moved to indicator "11" 38l, and illustrates movement lines 49 representing the changing display of the time interval. Alternatively, the user may use the cursor 48 to select line 39b and drag line 39b to a position corresponding to indicator "11" 38l where the drag ends. FIG. 4I illustrates the display of the changed time interval that corresponds to a time period from 12:00 through 11:59 and that has been displayed by reference to indicators 38a through 38h. To shorten the time interval from an end time of 11:59 to something earlier such as the original end time of 7:00, similar select and drag steps are followed except the direction of the drag is in the opposite direction to the direction illustrated in FIG. 4G. The start time of the interval may be changed in a similar fashion. As explained above, the user preferably uses a cursor and select and drag steps to make changes to the time interval. Alternatively, the user may provide input for a different definition of the relevant interval of time through keyboard input interaction with a dialog box or other graphical user interface mechanism such as are well known to those skilled in the art. Preferably, the result of the different definition of the time interval is that the changed time interval is displayed on the day class template.

As noted above, the user may change the schedule of operation of the process by providing a different specification for one or more modes of operation. To change to a different mode of operation, the user selects a mode representation such as mode representation 37 illustrated in FIG. 4G. The user erases or otherwise "trashes" the displayed mode representation, and provides a different specification for a different mode of operation of the process during the interval of time by typing or otherwise inputting a different specification representing the different mode of operation. Other acceptable methods of changing the specification of a mode of operation will occur to those skilled in the art. Preferably, the result of the different specification of the mode of operation is that the process is operated pursuant to the different mode of operation during the interval of time.

Operation of the Process Pursuant to the Schedule of Time Intervals as Defined and Depicted on a Day Class Template As noted above, once the user has defined a schedule of operation of the modes of the relevant process through use of the day class template of the present invention, the process is then operated according to the schedule. Also as noted above, the particular steps in following such a schedule and the operation of the modes is process specific. However, by way of example, the present invention is preferably implemented in the Area Number Calling service through a translation of the relevant information contained on each day class template for each subscriber to a decision graph for that subscriber followed by the Area Number Calling service for all calls that are directed to that subscriber. This translation of the information from the day class template to a decision graph is readily accomplished by a person of ordinary skill in the art. Additional information regarding the translation of information and implementation of the respective modes is provided below in connection with FIG. 6.

Once the user has defined a schedule of operation of the modes of the relevant process through use of the day class template of the present invention, the schedule is activated. Such activation is accomplished in a conventional manner by the use of one or more decision graphs or other logical mechanisms followed by the controller of the relevant process. For example, the Area Number Calling service operates pursuant to a system clock. Upon activation of a schedule for a particular ANC subscriber as defined by a day class template, the ANC service system notes the time and notes from the day class template that a particular mode of the ANC process should be operated at that time. This determination is conducted preferably at a particular network element such as a service control point serving the ANC service system and subscribers thereof. In particular, this determination is carried out based on a decision graph script maintained at the service control point. The decision graph script is the result (at least partially) of an object model based on the day class template associated with the subscriber. The creation of an object model from a graphic user interface implementation, such as a day class template, and the generation of a decision graph script based on the object model are operations well known to those skilled in the art.

Upon noting the time and that a particular mode of the ANC process should be operated at that time, the ANC service system then operates the ANC service pursuant to the designated mode. Referring to FIG. 4C, if the system clock indicates that the time is 2:02, then the ANC service system operates the ANC service pursuant to MAP 1 mode. The ANC service system continues to monitor the time and compare it to the designated mode of operation of the ANC service as defined by the day class template. When the end of a particular interval is reached and the process must be operated pursuant to a different mode, then the ANC service system changes the mode of operation as defined by the day class template. Referring to FIG. 4C again, if the system clock indicates that the time is 8:00, then the ANC service system operates the ANC service pursuant to a default mode of operation because no mode had been defined on the template.

General Description of the Calendar of Days

To further facilitate the scheduling and display of modes of operation of a relevant process over a period of time longer than a day, the present invention preferably provides a calendar of days. FIG. 5A illustrates a calendar as used on the graphical interface in the preferred embodiment of the present invention. The preferred calendar is displayed so that days on the calendar that run a particular schedule of the process (as defined by a day class template and also referred to as a "day class") are distinguished from other days on the calendar. In particular, each of the days on the calendar is assigned a preselected designation. A day class template is assigned to at least one day on the calendar. The assignation is based on a correspondence between the designation of the day class template and the preselected designation of the day. The calendar is displayed so that it reflects the assignation of the day class template to the day. Preferably, each day on the calendar that is assigned a particular day class template is displayed differently on the calendar from the other days. From this display, the user readily determines the schedule of modes of operation of the relevant process over the period of time displayed by the calendar.

Detailed Description of the Calendar

In the preferred embodiment, the displayed calendar is a conventional monthly calendar including a plurality of day blocks representing the days of the month. However, the calendar may be configured to represent a week, two weeks or some other period of time. Further, the displayed calendar preferably represents the current month when the user is using the system. Other periods of time including historical or future months or other periods of time may be displayed through the use of the calendar as herein described pursuant to the preferred embodiment of the present invention. For example, the user optionally may call up the calendar for the month of May 1994 to view the schedule of modes of operation for that month. Similarly, the user optionally may call up the calendar for the month of May 1997 to view the schedule for that month. The size of the calendar in terms of the time that the calendar covers is arbitrary, and to some extent is controlled by the user. For example, the user may set up the calendar for a year, several years or a decade.

Description of Preselected Designations

In the preferred embodiment, each of the day blocks of the calendar is assigned at least one preselected designation (also referred to as a day category). In addition, the preferred embodiment initially assigns the standard preselected designations of "dates", weekday, weekend, federal holiday, or religious holiday to the day blocks of the calendar. Each day block preferably includes a date as a preselected designation. A day block also may be assigned other preselected designations such as weekday, weekend, federal holiday, or religious holiday. Thus, the calendar of the preferred embodiment is generally configured so that each of the days on the calendar is assigned at least one preselected designation based on a characteristic of that day.

To set up the calendar for use, the preferred embodiment provides the user with a table of standard preselected designations that represent repetitive days on the calendar. For example, Table 1 illustrated below provides the user with a table of days of the week and the corresponding respective day class templates for the days of the week.

TABLE 1

| Day of Week | DCT |
|---|---|
| Sunday | $DCT_1$ |
| Monday | $DCT_2$ |
| Tuesday | $DCT_2$ |
| Wednesday | $DCT_2$ |
| Thursday | $DCT_2$ |
| Friday | $DCT_2$ |
| Saturday | $DCT_3$ |

As Table 1 illustrates, the schedule of operation of modes of a relevant process are operated pursuant to day class template 1 ($DCT_1$) on Sundays, and pursuant to day class template 2 ($DCT_2$) on Mondays–Saturdays.

However, the preferred embodiment allows the user to make further distinctions regarding the schedule of operation of the relevant process based on other characteristics of the day blocks on the calendar. In other words, a user is not limited to differentiation of the schedule of operation of modes of a relevant process based only on days of the week. The user may assign a day class template to a day block based on any preselected designation associated with the day block such as "date", weekday, weekend, federal holiday, religious holiday, etc. To provide for these further distinctions, the preferred embodiment provides the user with a table of preselected designations or categories of days or day blocks. For example, Table 2 illustrated below provides the user with a table of five preselected designations: Christian holidays, Federal holidays, Christmas, Easter, and New Year. As Table 2 illustrates, the schedule of operation of modes of a relevant process are operated pursuant to a day class template as selected by the user to correspond to a particular preselected designation (see DCT Actual and DCT Celebrated columns discussed below).

TABLE 2

| Day Category | Days | DCT Actual | DCT Celebrated |
|---|---|---|---|
| Christian Holidays | Christmas, Easter, . . . | $DCT_5$ | $DCT_4$ |
| Federal Holidays | New Year, Memorial Day, . . . | $DCT_4$ | $DCT_4$ |
| Christmas | | $DCT_6$ | $DCT_7$ |
| Easter | | $DCT_8$ | $DCT_8$ |
| New Year | | $DCT_9$ | $DCT_9$ |

Those skilled in the art will understand that fewer or additional preselected designations may be included in a table such as Table 2. Also, it should be noted that a preselected designation may include only one entry such as shown below in Table 2 of Christmas, Easter and New Year. Further, it should be noted that a particular day or day block may be included in only one preselected designation. This condition prevents ambiguity of assignments of day class templates. In addition, the inclusion of a particular day or day block as an only entry in a preselected designation or category results in that preselected designation taking precedent over any other category or designation that includes that entry. Thus, as illustrated in Table 2, Christmas is included in its own preselected designation and is not included in the Christian holidays. In addition, those skilled in the art will understand that the preselected designations may include standard categories such as would be understood by most users (such as illustrated in Table 2) and that are initially set up by the preferred embodiment rather than by the user. Standard categories may be changed by the user. Further, the preferred embodiment contemplates that a user may set up special preselected designations relevant to the user's operation of the modes of the process. For example, a user that must run a particular process on the fifteenth of each month may set up a preselected designation for itself that includes only the fifteenth of each month of the calendar. Such interactive use of a table such as Table 2 is accomplished in a manner well known to those skilled in the art. For another example, a user may find that business is affected by the occurrence of a professional baseball game in town and that the schedule of modes of operation of the relevant process need to be adjusted to take into account the baseball game day business. Thus, the user may create a "Baseball Game Day" preselected designation or category, and assign this preselected designation to certain days in the calendar. The present invention assigns the customized preselected designations to the calendar as necessary.

Advantageously, a table such as Table 2 provides the user with a quick and an easily read mechanism for choosing and/or setting up preselected designations. Table 2 also provides the user with a column ("Days") showing the days or day blocks that are included in that preselected designation. For example, in the entry of the Days column corresponding to the Christian holidays, the following day blocks are listed: Christmas, Easter, . . . . The Christmas entry is crossed out to indicate that it is the subject of a different preselected designation.

Through a mechanism such as Table 2, the preferred embodiment advantageously includes another feature that is particularly useful to users in differentiating the schedule of operation of the modes or a relevant process based on certain social conventions. To illustrate, it will be understood that certain holidays are not "celebrated" on the calendar date on which they respectively fall. For example, federal holidays are typically celebrated on the nearest Monday to the calendar date of the actual holiday. Table 2 includes two additional columns (DCT Actual and DCT Celebrated) that provide the user with the ability to differentiate the modes of operations of the relevant system between the calendar date of a holiday and the actual day celebrated. For example, as illustrated in Table 2, the user has selected that with respect to Christian holidays, day class template 5 (DCT sub5) is assigned the actual dates of the holidays and day class template 4 (DCT sub4) is assigned to the celebrated dates of the holidays. Of course, the user may choose to have the same day class template assigned to both the actual and celebrated dates of days within a certain category. For example, in Table 2, day class template 4 (DCT sub4) is assigned to both the actual and celebrated dates of Federal holidays.

It will be appreciated that the use of certain preselected designations is not static once the calendar has been configured. A user may change the preselected designations, may change the days included within any preselected designation, and thereby, may change the schedule of operation of the relevant process over a period of time affected by the changes and as illustrated in the calendar.

As noted above, each day class template defined by a user also is preferably assigned a designation such as designation 36 of day class template 30 in FIG. 4C. As a matter of nomenclature, it should be noted that the schedule of modes of operation set forth on a particular day class template may be referred to simply as a "day class". For example, a user may refer to the schedule of modes of operation for a particular day as belonging to the "Weekday" day class. Using the baseball example again, a user may designate a day class template as "Baseball Game Day" and define the schedule of modes of operation of the process for that day to take into account the baseball game day business. Thus, the user is likely to refer to the schedule as defined by the "Baseball Game Day" day class template as the "Baseball Game Day" day class, or "Baseball Game Day" schedule.

Advantageously, through interactive mechanisms such as Tables 1 and 2, the preferred embodiment provides the user with an opportunity of assigning a particular schedule of modes of operation of the relevant process to any day block within the calendar, to any group of repetitive day blocks within the calendar, and/or to any standard or user defined preselected designation of day blocks within the calendar. The creation and implementation of these tables through use of a graphic user interface, database, etc. are well known to those skilled in the art. Further, it will be appreciated that the assignment of particular day class templates (i.e., a particular schedule of operation of modes of the relevant process) may be accomplished through the use of other devices such as different tables, graphic user interfaces, pull-down menus, etc.

Description of the Assignation of Day Classes to the Calendar

Referring again to calendar 60 shown in FIG. 5A, each day class template defined by a user is assigned to a day of the calendar based on a correspondence between the designation of the day class template (the "day class") and the preselected designation of each day of the calendar. For example, a day class template that has been given the designation "weekday" by a user is assigned to each day in the calendar that has "weekday" as its preselected designation. The calendar then is displayed to reflect the assignment of each day class template to the respective days of the calendar. This display is accomplished by depicting each of the day blocks that correspond to a day assigned to a particular day class template so that these referenced day blocks have an appearance that is different from the other day blocks of the calendar. In this manner, a user perusing the calendar may readily discern the schedule of the modes of operation of the relevant process on a day-by-day basis for the displayed calendar.

More particularly described, FIG. 5A illustrates a calendar 60 as used in the preferred embodiment of the present invention. Calendar 60 is a monthly calendar representing days in a month. Each day is represented by a day block such as day block 61*a*. Calendar 60 is organized in a conventional manner such that the thirty-five day blocks 61*a*–61*ii* are organized in five rows 64*a*–64*e* and seven columns 66*a*–66*g*. Preferably, the head of each of the seven columns 66a–66g bears a designation representing the respective day of the week corresponding to that column. Obviously, a month in the Gregorian calendar has less than thirty-five days, but calendar 60 is configured to accommodate any conventional display of a month wherein seven columns are necessary to represent each day of the week, and wherein five rows may be necessary to represent the distribution of days over the seven columns.

FIG. 5A also illustrates the preferred assignation of day class templates to the respective days of the calendar. In particular, calendar 60 depicts four different types of day classes: weekday; weekend; holiday; and other. As noted, each one of these day classes correspond to a respective day class template bearing the day class designation. Based on the number of day classes defined by the user, more or fewer day classes may be depicted on the calendar.

Figure 5B:
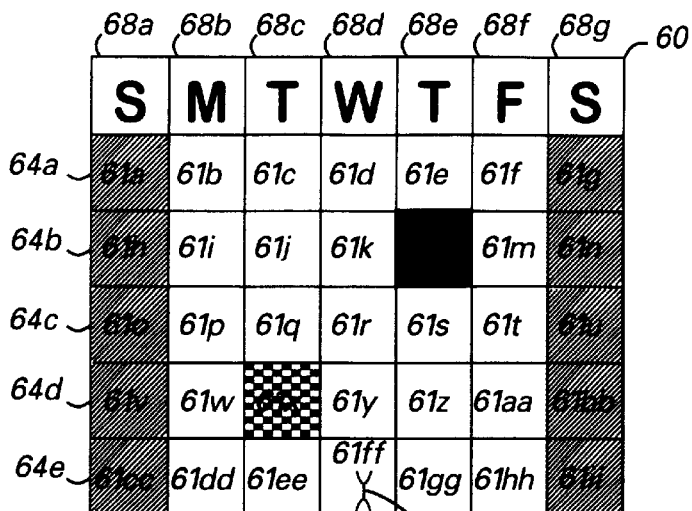
FIG. 5B depicts correspondence table 70 displayed by the preferred embodiment of the present invention for the user on the graphical user interface.
Figure 5B:
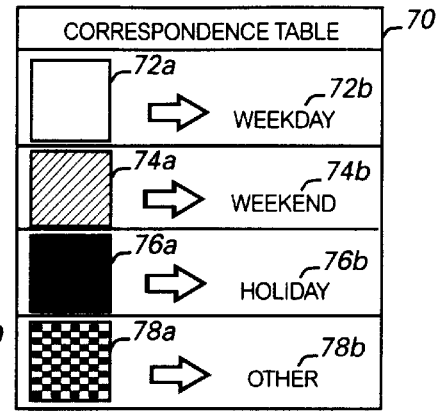

FIG. 5B depicts correspondence table 70 displayed by the preferred embodiment of the present invention for the user on the graphical user interface. The correspondence table is an aid to the user in readily determining the schedule of mode operation for the relevant process during the time period corresponding to the calendar. Correspondence table 70 includes four entries 72, 74, 76 and 78. Each entry corresponds to a day class appearing on calendar 60. Each entry includes two parts: (1) the denomination of the respective day class; and (2) a day block depicting the manner in which the respective day class is distinguished from other day blocks on calendar 60. The first entry 72 on correspondence table 70 includes a day block 72a whose interior area is white, and includes a denomination "Weekday" 72b for the name or designation of the day class. From this entry, the user readily determines that all day blocks on calendar 60 that have a white interior area represent days on which the process is operated according to the schedule of modes of operation as defined in the "Weekday" day class template 30. Referring to calendar 60, the day blocks that are assigned "Weekday" day class schedules include day blocks 61b–61f, 61i–61k, 61m, 61p–61t, 61w, 61y–61aa, and 61dd–61hh. For the convenience of the user, the preferred embodiment has been configured so that all day blocks that represent weekdays in the calendar have been assigned the preselected designation of "Weekday". By way of further explanation, the day blocks on calendar 60 having a white interior 61b–61f, 61i–61k, 61m, 61p–61t, 61w, 61y–61aa, and 61dd–61hh have been assigned the "Weekday" day class schedule as illustrated by the "Weekday" day class template shown in FIG. 5C.

Referring again to correspondence table 70 in FIG. 5B, the second entry 74 on correspondence table 70 includes a day block 74a whose interior area is gray, and includes a denomination "Weekend" 72b for the name or designation of the day class. From this entry, the user readily determines that all day blocks on calendar 60 having a gray interior area represent days on which the process is operated according to the schedule of modes of operation as defined in the "Weekend" day class template. Referring to calendar 60, the day blocks that are assigned "Weekend" day class schedules include day blocks 61a, 61g–61h, 61n–61o, 61bb–61cc, and 61ii. For the convenience of the user, the preferred embodiment has been configured so that all day blocks that represent a weekend day in the calendar have been assigned the preselected designation of "Weekend". By way of further explanation, the day blocks on calendar 60 having a graph interior 61a, 61g–61h, 61n–61o, 61bb–61cc, and 61ii have been assigned the "Weekend" day class schedule as illustrated by the "Weekend" day class template shown in FIG. 5D.

The third entry 76 on correspondence table 70 includes a day block 76a whose interior area is black, and includes a denomination "Holiday" for the name or designation of the day class. From this entry, the user readily determines that all day blocks on calendar 60 that have a black interior area represent days on which the process is operated according to the schedule of modes of operation as defined in the "Holiday" day class template. Referring to calendar 60, only one day block has been assigned a "Holiday" day class schedule, and this day block is day block 61l. For the convenience of the user, the preferred embodiment has been configured to keep a list of generally recognized holidays such as federal holidays and religious holidays so that all day blocks that represent a holiday in the calendar have been assigned the preselected designation of "Holiday". By way of further explanation, the day block on calendar 60 having a checked interior 61x has been assigned the "Holiday" day class schedule as illustrated by the "Holiday" day class template shown in FIG. 5E.

The fourth entry 78 on correspondence table 70 includes a day block 78a whose interior is checked, and includes a denomination "Other" for the name or designation of the day class. From this entry, the user readily determines that all day blocks on calendar 60 that have a checked area represent days on which the process is operated according to the schedule of modes of operation as defined in the "Other" day class template. Referring to calendar 60, only one day block has been assigned an "Other" day class schedule, and this day block is day block 61x. The term "Other" for a day class designation has been used here by way of example, but it is preferable for the user to define such designations in a more descriptive fashion such as "Baseball Game Days". By way of further explanation, the day block on calendar 60 having a black interior 61l has been assigned the "Other" day class schedule as illustrated by the "Other" day class template shown in FIG. 5F.

Further, it should be noted that the interior areas on the day blocks 61a–61ii have been depicted in this application as white, gray, black or checked, but that other methods of distinguishing a day block from other day blocks will be apparent to those skilled in the art. In particular, a particular day block may be distinguished from other day blocks by depicting the particular day block in its own unique color or font. In addition, the present invention optionally provides the user with the opportunity to select the manner in which the respective day blocks will be distinguished from each other. For example, the user may choose to distinguish day blocks that have a common preselected designation by depicting the day blocks that they all have the same color interior or are all a particular type face or font. As another example, the user may choose to distinguish day blocks that have all been assigned the same day class template by "bolding" these day blocks.

Description of Viewing A Day Class Template from the Calendar

Advantageously, the present invention allows a user to view the schedule of modes of operation of the relevant process over a relatively longer period of time by viewing the calendar such as the calendar month 60 illustrated in FIG. 5A on the graphical user interface. The present invention further allows a user to view the schedule of modes of operation of the relevant process over the course of a particular twenty-four hours during the displayed calendar simply by the selection of one of the day blocks of the calendar. In other words, if a user selects a particular day block and clicks the particular day block "open", the day class template assigned to that day block appears on the graphical user interface. Once the day class template is open on the graphical user interface, the user may simply view the template or may change the schedule of operation of the modes on the template as described above. Of course, if a user changes the schedule of operation of the modes on a particular day class template, then the operational schedules of all of the days assigned that day class template change.

Figure 6:
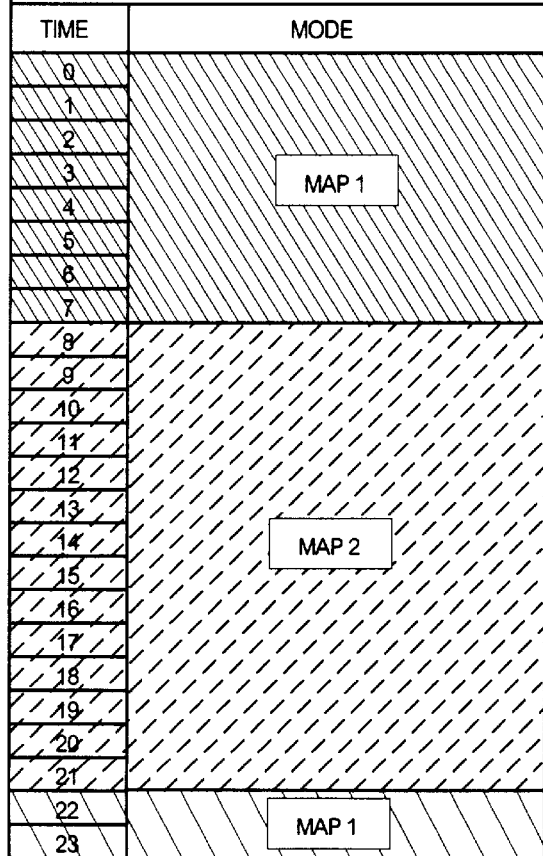
FIG. 6 illustrates the calendar to day class template feature of the present invention.

FIG. 6 illustrates the calendar to day class template feature of the present invention. As noted, if a user desires to see the schedule of modes of operation of the relevant process over a month's time, the user "opens" the calendar 60 using conventional techniques of a graphical user interface. To view the schedule for a particular day, the user "opens" the day block corresponding to the selected day. The effect of the "opening" of the day block is the display of the day class template assigned to that day block. FIG. 6 illustrates the positioning of a cursor 88 over day block 61$ff$ on calendar 60. After the user selects day block 61$ff$, the day class template corresponding to that day block appears on the graphical user interface. As illustrated in FIG. 6, the opening of day block 61$ff$ results in the display of "Weekday" day class template 30. The motion lines 89$a$–89$b$ illustrate that the "Weekday" day class template 30 appears to spring from day block 61$ff$. Thus, the user can quickly move from viewing the calendar to a particular day class template. To discontinue using either a day class template or the calendar, the user "closes" the representation in a conventional manner.

Operation of the Process Pursuant to the Calendar

The calendar allows the relevant process to be operated pursuant to a defined schedule that is longer than the twenty-four hours of a day class template. In effect, the calendar is a schedule of mode operation that is defined by the day class templates that are assigned to each day or day block of the calendar. Once the user has defined the schedules of operation through use of one or more day class templates and has defined the calendar through use of the preselected designations, the calendar is activated. Such activation is accomplished in a conventional manner by the use of one or more decision graphs or other logical mechanisms followed by the controller of the relevant process. For example, the Area Number Calling service operates pursuant to a system clock. Upon activation of the calendar, the ANC service system notes the day and notes from the calendar that a particular day class template is to govern the schedule of the ANC service. The ANC service system then operates the ANC service pursuant to the schedule defined by the particular day class template. Referring to FIG. 5A, if the system clock determines that the day corresponds to day block 611, then the ANC service system operates the ANC service pursuant to the schedule of modes defined by the "Holiday" day class template. The ANC service system continues to monitor the day and compare it to the calendar. When the end of a particular day is reached, then the ANC service system checks which day class template is to govern the new day. Referring again to FIG. 5A, if the system clock indicates that the "new" day corresponds to day block 61$m$, then the ANC service system operates the ANC service pursuant to the schedule of modes defined by the "Weekday" day class template. In the ANC system, the calendar and its associated day class templates are implemented to control the schedule of operation of the modes of the ANC service for a particular subscriber through a particular network element such as a service control point. The service control point maintains a decision graph script related to the calendar and its associated day class templates. The decision graph script is the result (at least partially) of an object model based on the day class template associated with the subscriber. The creation of an object model from a graphic user interface implementation, such as a day class template, and the generation of a decision graph script based on the object model are operations well known to those skilled in the art.

Description of Steps to Create or Edit a Day Class Template

Figure 7A:
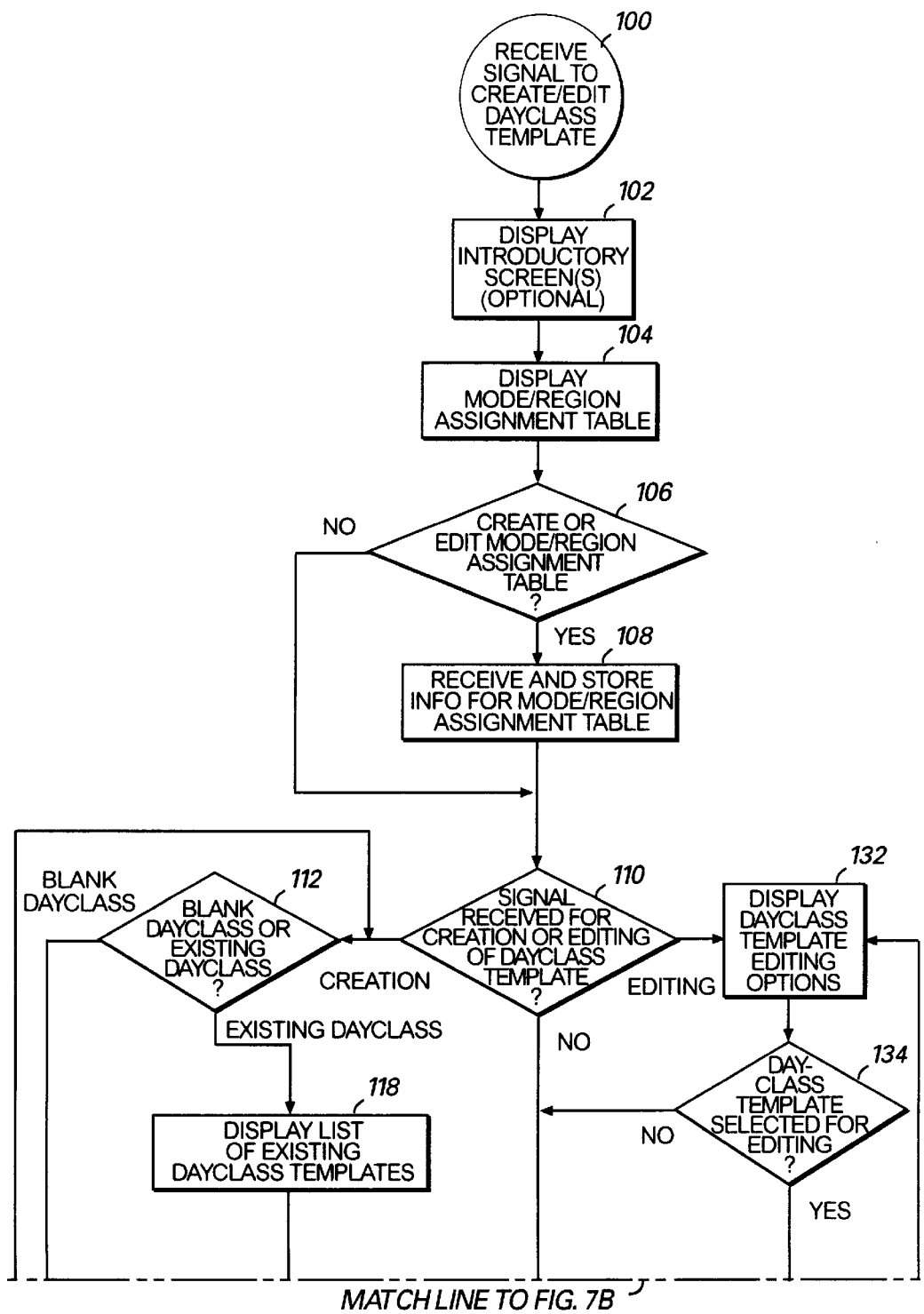
FIG. 7 is a flow chart illustrating the preferred operation of the system of the present invention with respect to the creation or editing of a day class template(s).
Figure 7B:
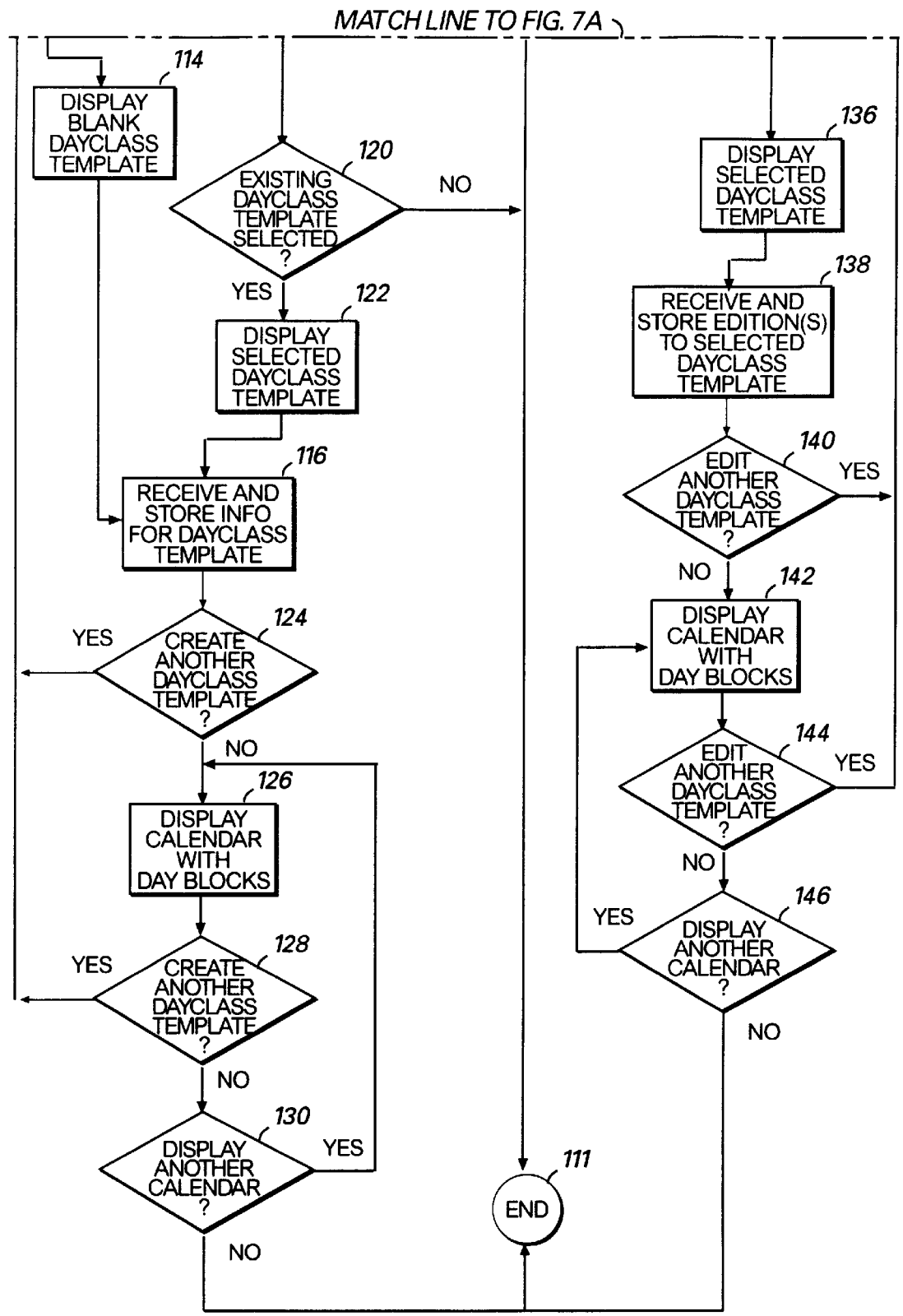
Figure 8:
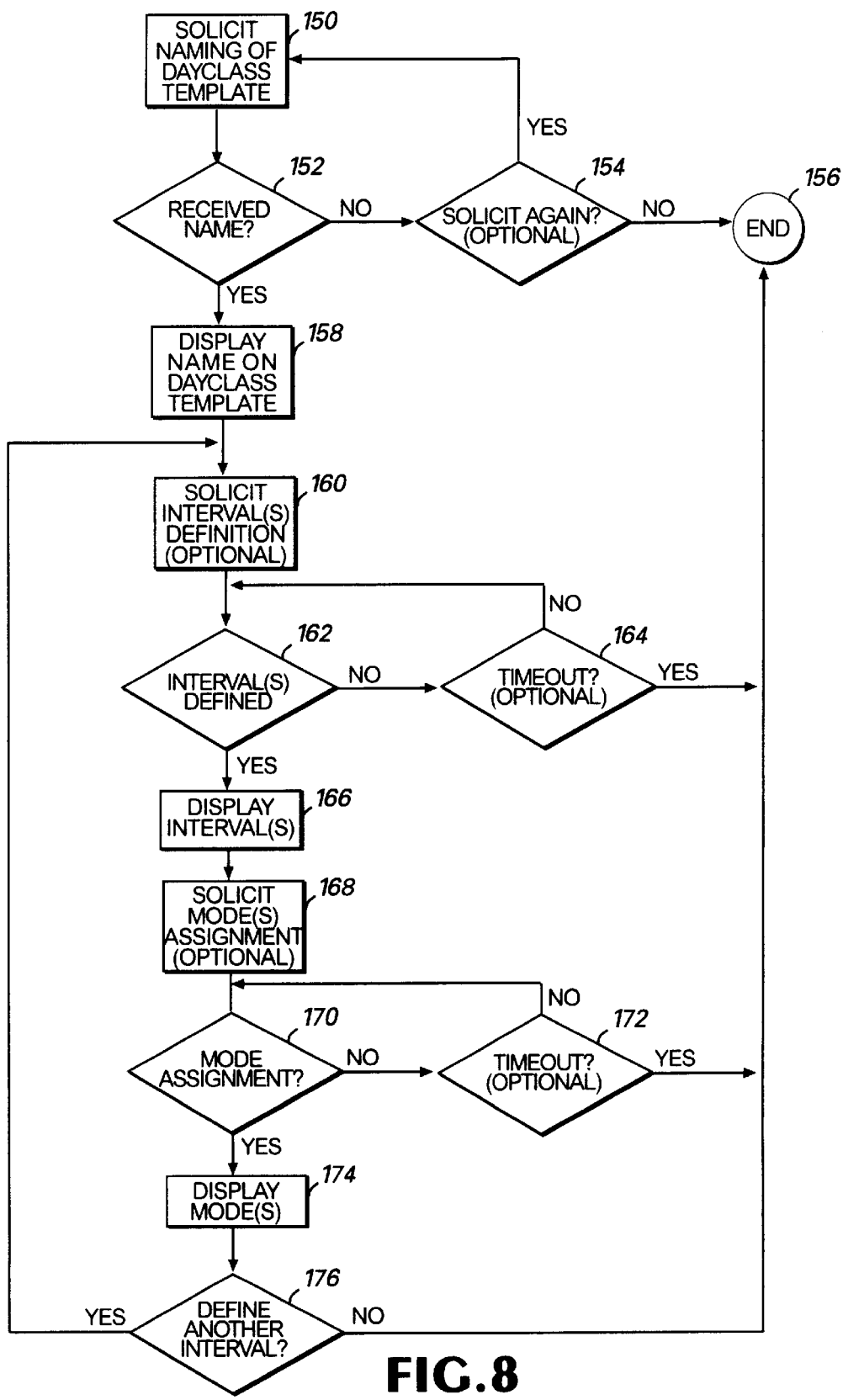
FIG. 8 is a flow chart illustrating the preferred operation of the system of the present invention with respect to interaction with a user in the creation of a day class template.
Figure 9:
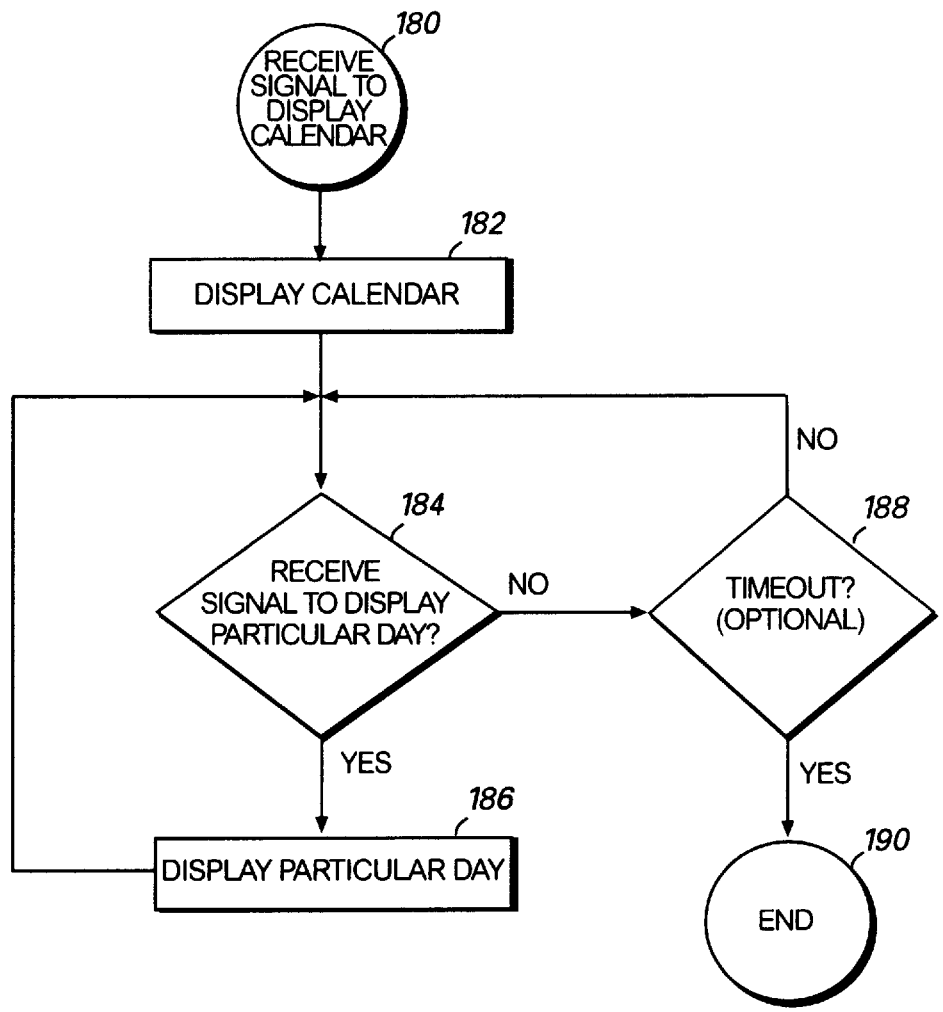
FIG. 9 is a flow chart illustrating the preferred operation of the system of the present invention with respect to interaction with a user in the display of the calendar and the display of a particular day class template assigned to a day block on the calendar.

The flow diagrams in FIGS. 7–9 provide a detailed description of the process steps executed by the corresponding processing circuitry of the system implementing the present invention. By way of analogy to an electrical circuit diagram, these flow diagrams are equivalent to a detailed schematic for an electrical circuit where provision of the circuitry for electrical circuit blocks corresponds to provision of actual computer instructions for the flow diagram blocks. Thus, the coding of the process steps of these flow diagrams into instructions of suitable commercially available computers is a mere mechanical step for a person skilled in the programming art.

FIG. 7 is a flow chart illustrating the preferred operation of the system of the present invention with respect to the creation or editing of a day class template(s) for a particular process. For example, in the case of the Area Number Calling service, the flow chart of FIG. 7 illustrates the system operation for the creation or editing of a day class template for a particular entity or person that subscribes to the Area Number Calling service. It should be noted that the "user" may be the subscriber or may be a representative of the service provider that provides the Area Number Calling service. At step 110, the system receives a signal from the user to create or edit a day class template. In step 102, the system optionally displays one or more introductory screens on the graphical user interface. These introductory screens may welcome the user and provide the user with miscellaneous information. In step 104, a mode/region assignment table for the particular process is displayed. As noted above, the mode/region assignment table is particular to the Area Number Calling service, and other processes may have different methods to define the modes of operation of the relevant process. The user is provided with the option of creating or editing the mode/region assignment table. In step 106, the system checks whether the user has taken advantage of this option. This step is offered herein as a convenience to the user rather than a necessary step to the present invention. If the user decides against creating or editing the mode/region assignment table, then the system will receive no signal and it proceeds to step 110. However, if the user decides to create or edit the mode/region assignment table, then in step 108 the step receives and stores such information for the mode/assignment table.

In step 110 of FIG. 7, the system checks whether a signal has been received for creation or editing of a day class template. If no signal has been received, then the system proceeds to end step 111. If a signal has been received for the creation of a day class template, the system checks whether the user has chosen to create a day class template based on the use of a blank day class template or based on an existing day class template. If the user has chosen to use a blank day class template, then in step 114 the system displays a blank day class template such as the day class template illustrated in FIG. 4A and described above. In step 116, the system receives and stores the information relevant to the creation of a day class template based on the blank day class template. As part of the step of receiving and storing the information relevant to the newly created day class template, the system notes the designation or name accorded to the day class template created by the user. In the preferred embodiment, the day class template then is assigned to one or more day blocks of the calendar. As describe above, the assignment is based on a correspondence between the designation or name of the day class template and the preselected designation of each of the day blocks of the calendar. For example, the user may have created a day class template and named it "Holiday". The system notes this designation, and assigns the day class template to all day blocks that have the preselected designation "Holiday". More detail regarding the steps of the provision of information for defining the day class schedule on the day class template is provided in connection with described below.

Referring again to step 112, if the user has chosen to define a day class schedule based on an existing day class template, then in step 118 the system displays a list of the existing day class templates (if any) that have already been created for the relevant process. In step 120, the system checks whether the user has selected one of the existing day class templates. If not, then the system proceeds to end step 111. If the user has selected an existing day class template, then in step 122 the system displays the selected day class template. In step 116, the system receives and stores the information relevant to the creation of a day class template based on the existing day class template. As with the creation of a day class template from a blank template, the system notes the designation or name accorded to the day class template created or reworked by the user. The day class template then is assigned to one or more day blocks of the calendar. More detail regarding the steps of the provision of information for defining the day class schedule on the day class template is provided in connection with FIG. 8 described below.

In step 124, the system checks whether the user desires to create another day class template. If so, then the system returns to step 112. If not, in step 126 the system displays a calendar such as calendar 60 described above in connection with FIGS. 5A and 6. The calendar is displayed to reflect the assignation of the day class template created by the user to day blocks of the calendar. In step 128, the system checks again whether the user desires to create another day class template. If so, then the system returns to step 112. If not, then in step 130 the system checks whether another (different) calendar should be displayed. For example, if the calendar is displayed on a monthly basis, then the user may choose to view a month of the calendar different from the calendar displayed in step 126. If the user decides to view such a calendar, then the system returns to step 126 and displays the selected calendar. If the user decides not to view such a calendar, then the system proceeds to end step 111.

Referring again to step 110 of FIG. 7, wherein the system checks whether a signal has been received for creation or editing of a day class template, if a signal has been received for the editing of a day class template, then in step 132 the system displays a list of the existing day class templates (if any) that have already been created for the relevant process. These templates may be used by the user to change the schedule of the modes of operation of the relevant process as explained generally above in connection with FIGS. 4G–4I. In step 132, the system checks whether the user has selected one of the existing day class templates. If not, then the system proceeds to end step 111. If the user has selected an existing day class template, then in step 136 the system displays the selected day class template. In step 138, the system receives and stores the information relevant to the creation of a day class template based on the existing day class template. More detail regarding the steps of the provision of information for defining the day class schedule on the day class template is provided in connection with FIG. 8 described below. In step 140, the system checks whether the user desires to edit another day class template. If so, then the system returns to step 132. If not, then in step 142 the system displays a calendar such as calendar 60 described above in connection with FIGS. 5A and 6. The calendar is displayed to reflect the assignation of the day class template edited by the user to day blocks of the calendar. In step 144, the system checks again whether the user desires to edit another day class template. If so, then the system returns to step 132. If not, then in step 146 the system checks whether another (different) calendar should be displayed. If the user decides to view such a calendar, then the system returns to step 142 and displays the selected calendar. If the user decides not to view such a calendar, then the system proceeds to end step 111.

Description of Steps of User Interaction in the Creation of a Day Class Template FIG. 8 is a flow chart illustrating the preferred operation of the system of the present invention with respect to interaction with a user in the creation of a day class template. The steps of FIG. 8 are described in the context of a user defining a schedule for the mode of operation of a relevant process through the use of a blank day class template. However, many of these steps are applicable to the use of an existing day class template to define a schedule of mode operation or to change the schedule using the editing techniques described above. As a first step, step 150, the preferred embodiment solicits the user for a name or designation for the day class template. As described above, the designation of the day class template is used in the process of assigning day class templates to day blocks in the calendar. Preferably, the user is provided with a list of appropriate designations for the day class template, such as weekday, weekend, etc. As an option, the user may name or designate the day class template with a particular date such as "Apr. 18, 1996". The day blocks in the calendar have been assigned preselected designations including dates. On the basis of the "Apr. 18, 1996" designation of the day class template, the present invention assigns the day class template to the day block in the calendar that includes Apr. 18, 1996 as a preselected designation. In addition, the user may create a unique name or designation that is not on the list of designations provided by the present invention. In this case, the user is required set up the unique name or designation as a preselected designation for use with the day blocks of the calendar.

Referring again to FIG. 8, in step 152 the system checks whether it has received a name or designation for the day class template. If not, then in optional step 154 the system checks whether it should solicit the user again for a name or designation for the template. If the system is not to solicit the user again, then the system proceeds to end step 156. If the system is to make another solicitation, then the system returns to step 150. Referring to step 152 again, if the system has received a name or designation, then in step 158 the system displays the name or designation on the day class template. In optional step 160, the system then proceeds to solicit the user for a definition of an interval of time. In step 162, the system checks whether an interval of time has been defined. If not, then in optional step 164 the system checks whether a timeout has occurred. If so, the system proceeds to end step 156. If the timeout has not occurred, the system returns to step 162. If an interval has been defined, then in step 166 the system displays the interval of time on the day class template. In optional step 168, the system solicits the user for assignment of a mode of operation to the interval of time defined by the user. In step 170, the system checks whether a mode of operation has been assigned to the defined interval of time. If no mode has been assigned, then in optional step 172 the system checks whether a timeout has occurred. If so, the system proceeds to end step 156. If the timeout has not occurred, the system returns to step 170. If a mode has been assigned, then in step 174 the system displays the mode on the day class template, preferably in association with the defined interval of time. In step 176, the system checks whether another interval is to be defined. If so, the steps beginning with step 160 are repeated. If not, then the system proceeds to end in step 156.

Description of Steps of User Interaction in Display of the Calendar

FIG. 9 is a flow chart illustrating the preferred operation of the system of the present invention with respect to interaction with a user in the display of the calendar and the display of a particular day class template assigned to a day block on the calendar. In step 180, the system receives a signal to display the calendar associated with a particular process. Using the example of the Area Number Calling service again, the system may receive a signal to display the calendar associated with a particular subscriber of the service. In step 182, the system displays the calendar. In step 184, the system checks to see whether it has received a signal to display a particular day. As described above, the user may indicate the desire to view a particular day class template associated with a day block (and hence a particular day) on the calendar by "opening" the relevant day block or clicking on it. If a signal has been received to display a particular day, then in step 186 the system displays the particular day. After displaying the particular day, the system returns to step 184 to check whether a signal has been received to display a particular day. If no such signal has been received, then in optional step 188 the system checks whether a timeout has occurred. If so, the system proceeds to end step 190. If the timeout has not occurred, the system returns to step 184.

While this invention has been described in detail with particular reference to preferred embodiments thereof, it will be understood that variations and modifications can be effected within the spirit and scope of the invention as described hereinabove and as defined in the appended claims.

What is claimed is:

1. In a system including a computer that provides for user input through a graphical user interface, a method for defining and depicting the operational mode of a process based on temporal factors, comprising the steps of:

displaying a day class template on said graphical user interface, said day class template comprising a time category displayed adjacent to a mode category, said time category further depicting a plurality of indicators chronologically arranged to represent selected times within a twenty-four hour period;

receiving from said user a designation for said day class template;

in response to receiving said designation, displaying said designation on said day class template;

receiving from said user a definition for an interval of time;

in response to receiving said definition, displaying said interval of time pursuant to said definition on said day class template;

receiving from said user a specification of a mode of operation of said process during said interval of time;

in response to receiving said specification, displaying a representation of said mode of operation of said process on said day class template; and operating said process pursuant to said mode of operation during said interval of time.

2. The method of claim 1, further comprising the steps of:

receiving from said user a different definition of said interval of time;

in response to receiving said different definition, changing said interval of time by displaying a changed interval of time on said day class template; and in response to changing said interval of time, operating said process pursuant to said mode of operation during said changed interval of time.

3. The method of claim 2, wherein said mode category defines a mode block, said mode block corresponding to said definition of said interval of time, and wherein said step of displaying said interval of time comprises displaying said mode block corresponding to said interval of time; and wherein said step of changing said interval of time to a changed interval of time on said day class template comprises changing said mode block to a changed mode block on said day class template.

4. The method of claim 1, further comprising the steps of:

receiving from said user a different specification for a different mode of operation of said process during said interval of time;

in response to receiving said different specification, changing said representation of said mode of operation by displaying a changed representation corresponding to said different mode of operation on said day class template; and in response to changing said representation, operating said process pursuant to said different mode of operation during said interval of time.

5. The method of claim 1, further comprising the steps of:

receiving from said user a second definition for a second interval of time;

in response to receiving said second definition, displaying said second interval of time pursuant to said second definition on said day class template;

receiving from said user a second specification of a second mode of operation of said process during said second interval of time;

in response to receiving said second specification, displaying a second representation of said second mode of operation of said process on said day class template; and operating said process pursuant to said second mode of operation during said second interval of time.

6. The method of claim 5, wherein said mode category defines a first mode block, said first mode block corresponding to said definition of said interval of time, and a second mode block, said second mode block corresponding to said second definition of said second interval of time;

wherein said step of displaying said interval of time comprises displaying said first mode block corresponding to said interval of time; and wherein said step of displaying said second interval of time comprises displaying said second mode block corresponding to said second interval of time.

7. The method of claim 1, further comprising the step of:
operating said process pursuant to a default mode of operation at times other than said interval of time.

8. The method of claim 1, wherein said definition of said interval of time comprises a start time for said interval of time, and
wherein said step of receiving from said user said definition comprises receiving said start time; and
wherein said step of displaying said interval of time comprises displaying said start time on said day class template.

9. The method of claim 8,
wherein said start time is defined by a first indicator of said plurality of indicators;
wherein said step of receiving said start time comprises receiving a first signal corresponding to said first indicator; and
wherein said step of displaying said start time comprises distinguishing said first indicator from the other indicators of said plurality of indicators on said day class template.

10. The method of claim 8, wherein said start time is defined by a start time indicator, said start time indicator being different from said plurality of indicators, and
wherein said step of receiving said start time comprises receiving said start time indicator; and
wherein said step of displaying said start time comprises displaying said start time indicator chronologically positioned among said chronologically arranged plurality of indicators.

11. The method of claim 10, wherein said end time is defined by an end time indicator, said end time indicator being different from said plurality of indicators, and
wherein said step of receiving said end time comprises receiving said end time indicator; and
wherein said step of displaying said end time comprises displaying said end time indicator chronologically positioned among said chronologically arranged plurality of indicators.

12. The method of claim 10, further comprising the step of distinguishing said start time indicator and said end time indicator from said chronologically arranged plurality of indicators on said day class template.

13. The method of claim 12, wherein said step of distinguishing said start time indicator and said end time indicator comprises distinguishing all indicators of said plurality of indicators that are chronologically displayed between said start time indicator and said end time indicator.

14. The method of claim 1, wherein said definition of said interval of time comprises an end time for said interval of time, and
wherein said step of receiving from said user said definition comprises receiving said end time; and
wherein said step of displaying said interval of time comprises displaying said end time on said day class template.

15. The method of Claim 14,
wherein said end time is defined by an end time indicator of said plurality of indicators;
wherein said step of receiving said end time comprises receiving a corresponding to said end time indicator; and wherein said step of displaying said end time comprises distinguishing said end time indicator from the other indicators of said plurality of indicators on said day class template.

16. The method of claim 15, further comprising the step of distinguishing all indicators of said plurality of indicators that are chronologically displayed between said first indicator and said second indicator.

17. The method of claim 1, wherein said mode category defines a mode block, said mode block corresponding to said definition of said interval of time, and
wherein said step of displaying said interval of time comprises displaying said mode block corresponding to said interval of time.

18. The method of claim 17,
wherein said step of displaying said mode block corresponding to said interval of time comprises defining a start time for said interval with a first reference to a first indicator of said plurality of indicators, said first indicator representing a first selected time within said twenty-four hour period, and by defining an end time for said interval of time with a second reference to a second indicator, said second indicator representing a second selected time within said twenty-four hour period.

19. The method of claim 18,
wherein said first reference is a first graphic image displayed in said mode category as a first side of said mode block, said first graphic image extending perpendicularly from said first indicator across said mode category, and
wherein said second reference is a second graphic image displayed in said mode category as a second side of said mode block, said second graphic image extending perpendicularly from said second indicator across said mode category; and
wherein said step of displaying said mode block comprises depicting said first graphic image and said second graphic image so that said first graphic image and said second graphic image define said mode block within said mode category.

20. The method of claim 17, further comprising the step of distinguishing said mode block within said mode category from the remainder of said mode category.

21. The method of claim 17, wherein said step of displaying said representation of said mode of operation comprises displaying said representation within said mode block.

22. The method of claim 1, wherein said process is a service of an advanced intelligent network, and wherein said step of operating said process comprises operating said advanced intelligent network service pursuant to said mode of operation during said interval of time.

23. The method of claim 1, further comprising the steps of:
providing a calendar having a plurality of days, each of said days having a preselected designation;
assigning said day class template to a day of said plurality of days of said calendar, said assignation based on a correspondence between said designation of said day class template and said preselected designation of said day; and
displaying said calendar to reflect said assignation of said day class template to said day.

24. The method of claim 23, wherein said calendar is a monthly calendar having a plurality of day blocks, each of said day blocks representing a respective day of said monthly calendar, and wherein said step of displaying said calendar comprises displaying said monthly calendar to reflect said assignation of said day class template by depicting each of said day blocks corresponding to said day assigned said day class template differently from the other day blocks of said calendar.

25. In a system including a computer that provides for user input through a graphical user interface, a method for defining and depicting the operational mode of a process based on temporal factors, comprising the steps of:

displaying a day class template on said graphical user interface, said day class template comprising a time category displayed adjacent to a mode category, said time category further depicting a plurality of indicators chronologically arranged to represent selected times within a twenty-four hour period;

receiving from said user a designation for said day class template;

in response to receiving said designation, displaying said designation on said day class template;

receiving from said user a definition for an interval of time;

in response to receiving said definition, displaying said interval of time pursuant to said definition on said day class template;

receiving from said user a specification of a mode of operation of said process during said interval of time;

in response to receiving said specification, displaying a representation of said mode of operation of said process on said day class template;

operating said process pursuant to said mode of operation during said interval of time;

providing a calendar having a plurality of days, each of said days having a preselected designation;

assigning said day class template to a day of said plurality of days of said calendar, said assignation based on a correspondence between said designation of said day class template and said preselected designation of said day; and displaying said calendar to reflect said assignation of said day class template to said day.

26. In a system including a computer that provides for user input through a graphical user interface, a method for indicating the general schedule of operation of a process over a predetermined period of time, comprising the steps of:

displaying on said graphical user interface a calendar of days representing said predetermined period of time;

defining a day class, said day class representing a schedule of operation of said process during a twenty-four hour period;

assigning each day of said calendar on which said schedule of operation of said process is to be followed to said day class; and depicting each day assigned to said day class differently from other days of said calendar not assigned to said day class.

27. The method of claim 26, wherein said day class comprises a first day class, and further comprising the steps of:

defining a second day class, said second day class representing a second schedule of operation of said process during a different twenty-four hour period;

assigning each day of said calendar on which said second schedule of operation of said process is to be followed to said second day class; and depicting each day assigned to said second day class differently from said days assigned to said first day class and from other days of said calendar not assigned to said first day class or said second day class.

28. The method of 26, further comprising the steps of:

receiving from said user a selection of a particular day of said calendar; and in response to receiving said selection, displaying on said graphical user interface a day class template corresponding to said day class of said particular day.

29. The method of 28, wherein said day class template specifies an interval of time and wherein said day class template specifies a mode of operation of said process during said interval of time; and wherein said step of displaying said day class template comprises displaying a representation of said interval of time and displaying a symbol for said mode of operation of said process during said interval of time.

30. The method of 29, further comprising the step of:

changing, in response to input by said user, said interval of time for said mode of operation of said process.

31. The method of 30, further comprising the step of:

in response to said step of changing said interval of time, changing said display of said representation of said interval of time to reflect said change in said interval of time.

32. The method of claim 29, further comprising the step of:

changing, in response to input by said user, said mode of operation of said process during said interval of time.

33. The method of claim 32, further comprising the step of:

in response to said step of changing said mode of operation of said process, changing said display of said symbol of said mode of operation to reflect the change in said mode of operation.

34. The method of claim 26, wherein said calendar of days comprises a plurality of day blocks with each day block having an interior area; and wherein said step of depicting said each day assigned to said day class comprises depicting an interior area of a day block corresponding to said each day assigned to said day class differently from other interior areas of other day blocks corresponding to said other days of said calendar not assigned to said day class.

35. The method of claim 34, wherein said step of depicting said interior area of said day block comprises depicting said interior area of said day block corresponding to said each day assigned to said day class with a different color from said other interior areas of said other day blocks corresponding to said other days of said calendar not assigned to said day class.

36. The method of claim 34, wherein said step of depicting said interior area of said day block comprises depicting said interior area of said day block corresponding to said each day assigned to said day class in a different pattern from said other interior areas of said other day blocks corresponding to said other days of said calendar not assigned to said day class.

37. In a system including a computer that provides for user input through a graphical user interface, a method for indicating the general schedule of operation of a process over a predetermined period of time, comprising the steps of:

displaying on said graphical user interface a calendar of days representing said predetermined period of time;

providing a standard preselected designation that includes selected days from said calendar of days;

defining a day class, said day class representing a schedule of operation of said process during a twenty-four hour period;

assigning said day class to said standard preselected designation so that said day class is assigned to said selected days of said standard preselected designation; and depicting said selected days of said standard preselected designation differently from other days of said calendar.

38. The method of claim 37, wherein said step of providing said standard preselected designation comprises providing a listing of said selected days included in said standard preselected designation, and providing an opportunity to a user to delete a selected day of said selected days or to add a day to said selected days so as to change said standard preselected designation.

39. In a system including a computer that provides for user input through a graphical user interface, a method for indicating the general schedule of operation of a process over a predetermined period of time, comprising the steps of:

displaying on said graphical user interface a calendar of days representing said predetermined period of time;

providing a special preselected designation that allows a user to compile selected days from said calendar of days into said special preselected designation;

defining a day class, said day class representing a schedule of operation of said process during a twenty-four hour period;

assigning said day class to said special preselected designation so that said day class is assigned to said selected days of said special preselected designation; and depicting said selected days of said special preselected designation differently from other days of said calendar.

40. In a system including a computer that provides for user input through a graphical user interface, a method for indicating the general schedule of operation of a process over a predetermined period of time, comprising the steps of:

displaying on said graphical user interface a calendar of days representing said predetermined period of time;

defining a day class, said day class representing a schedule of operation of said process during a twenty-four hour period;

assigning each day of said calendar on which said schedule of operation of said process is to be followed to said day class;

depicting each day assigned to said day class in a different manner from other days of said calendar not assigned to said day class; and providing a correspondence table that depicts correspondence between the day class and the different manner in which said each day assigned to said day class is depicted.

* * * * *